US011632751B2

(12) United States Patent
Sengupta et al.

(10) Patent No.: US 11,632,751 B2
(45) Date of Patent: Apr. 18, 2023

(54) DETERMINING AN ENERGY PER RESOURCE ELEMENT FOR A SYMBOL INCLUDING A CELL-SPECIFIC REFERENCE SIGNAL

(71) Applicant: QUALCOMM Incorporated, San Diego, CA (US)

(72) Inventors: Ayan Sengupta, San Diego, CA (US); Alberto Rico Alvarino, San Diego, CA (US); Le Liu, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 7 days.

(21) Appl. No.: 17/248,359

(22) Filed: Jan. 21, 2021

(65) Prior Publication Data

US 2021/0243742 A1 Aug. 5, 2021

Related U.S. Application Data

(60) Provisional application No. 62/968,953, filed on Jan. 31, 2020.

(51) Int. Cl.
*H04W 72/04* (2009.01)
*H04L 27/26* (2006.01)

(52) U.S. Cl.
CPC ....... *H04W 72/042* (2013.01); *H04L 27/2601* (2013.01)

(58) Field of Classification Search
CPC ............. H04W 72/042; H04L 27/2601; H04L 27/261; H04L 5/005; H04L 5/0064; H04L 5/0044
See application file for complete search history.

(56) References Cited

U.S. PATENT DOCUMENTS

| 2017/0273026 | A1* | 9/2017 | Fakoorian | ............... H04W 4/70 |
| 2020/0345969 | A1* | 11/2020 | Choi | ..................... A61M 21/02 |
| 2021/0329591 | A1* | 10/2021 | Hwang | ................. H04W 68/02 |

FOREIGN PATENT DOCUMENTS

EP     2725837 A1     4/2014

OTHER PUBLICATIONS

International Search Report and Written Opinion—PCT/US2021/070071—ISA/EPO—dated Apr. 26, 2021.
(Continued)

*Primary Examiner* — Shailendra Kumar

(74) *Attorney, Agent, or Firm* — Qualcomm Incorporated

(57) ABSTRACT

Various aspects of the present disclosure generally relate to wireless communication. In some aspects, a user equipment (UE) may determine, for an orthogonal frequency division (OFDM) symbol that includes one or more cell-specific reference signal (CRS) resource elements and one or more narrowband physical downlink shared channel (NPDSCH) resource elements, an NPDSCH energy per resource element (EPRE), wherein the NPDSCH EPRE for the OFDM symbol is based at least in part on an EPRE differential between a narrowband reference signal (NRS) EPRE and a CRS EPRE. The UE may demodulate the OFDM symbol based at least in part on the NPDSCH EPRE. Numerous other aspects are provided.

48 Claims, 12 Drawing Sheets

(56) References Cited

OTHER PUBLICATIONS

Qualcomm Incorporated: "Maintenance for Wake-Up Signal", 3GPP Draft, 3GPP TSG-RAN WG1 #94, R1-1809012, Maintenance for NWUS Remaining Issue, 3rd Generation Partnership Project (3GPP), Mobile Competence Centre, 650, Route Des Lucioles, F-06921 Sophia-Antipolis Cedex, France, vol. RAN WG1. No. Gothenburg, Sweden, Aug. 20, 2018-Aug. 24, 2018, Aug. 11, 2018 (Aug. 11, 2018), XP051516384, 3 Pages, Retrieved from the Internet: URL: http://www.3gpp.org/ftp/tsg%5Fran/WG1%5FRL1/TSGR1%5F94/Docs/R1%2D1809012%2Ezip.

* cited by examiner

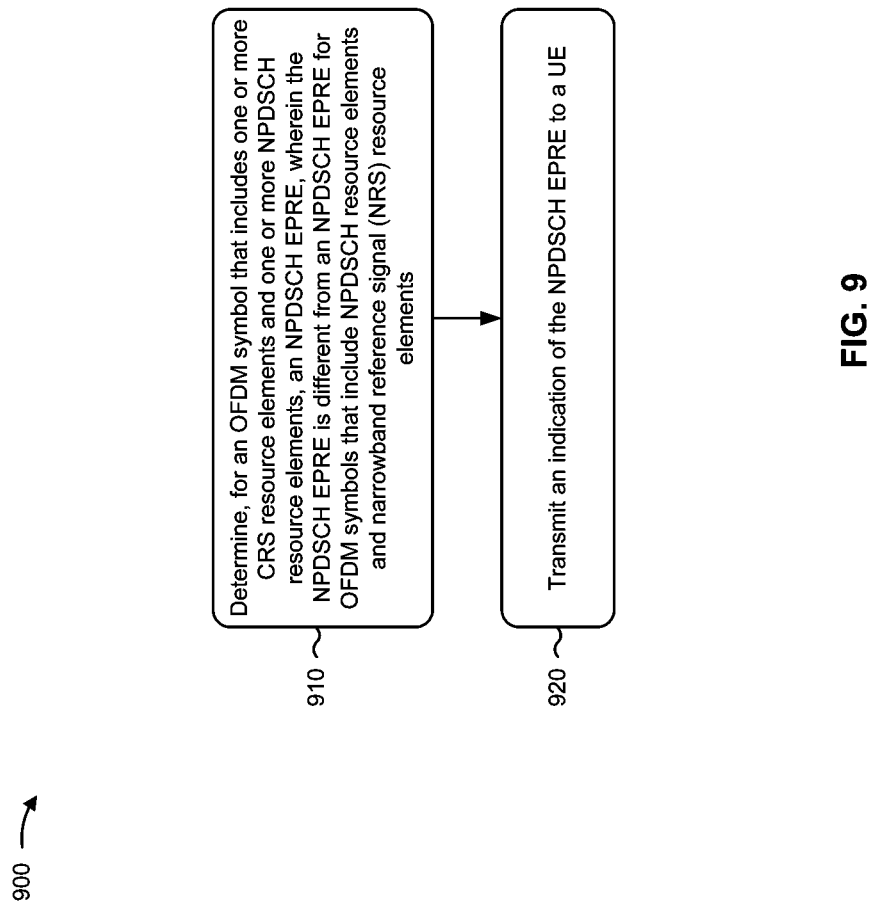

DETERMINING AN ENERGY PER RESOURCE ELEMENT FOR A SYMBOL INCLUDING A CELL-SPECIFIC REFERENCE SIGNAL

CROSS-REFERENCE TO RELATED APPLICATION

This Patent Application claims priority to U.S. Provisional Patent Application No. 62/968,953, filed on Jan. 31, 2020, entitled "DETERMINING AN ENERGY PER RESOURCE ELEMENT FOR A SYMBOL INCLUDING A CELL-SPECIFIC REFERENCE SIGNAL," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for determining an energy per resource element for a symbol including a cell-specific reference signal.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining, for an orthogonal frequency division (OFDM) symbol that includes one or more cell-specific reference signal (CRS) resource elements and one or more narrowband physical downlink shared channel (NPDSCH) resource elements, an NPDSCH energy per resource element (EPRE), wherein the NPDSCH EPRE for the OFDM symbol is based at least in part on an EPRE differential between a narrowband reference signal (NRS) EPRE and a CRS EPRE; and demodulating the OFDM symbol based at least in part on the NPDSCH EPRE.

In some aspects, a method of wireless communication, performed by a base station (BS), may include determining, for an OFDM symbol that includes one or more CRS resource elements and one or more NPDSCH resource elements, an NPDSCH EPRE, wherein the NPDSCH EPRE for the OFDM symbol is based at least in part on an EPRE differential between an NRS EPRE and a CRS EPRE; and transmitting an indication of the NPDSCH EPRE to a UE.

In some aspects, a UE for wireless communication may include a memory and one or more processors operatively coupled to the memory. The memory and the one or more processors may be configured to determine, for an OFDM symbol that includes one or more CRS resource elements and one or more NPDSCH resource elements, an NPDSCH EPRE, wherein the NPDSCH EPRE for the OFDM symbol is based at least in part on an EPRE differential between an NRS EPRE and a CRS EPRE; and demodulate the OFDM symbol based at least in part on the NPDSCH EPRE.

In some aspects, a BS for wireless communication may include a memory and one or more processors operatively coupled to the memory. The memory and the one or more processors may be configured to determine, for an OFDM symbol that includes one or more CRS resource elements and one or more NPDSCH resource elements, an NPDSCH EPRE, wherein the NPDSCH EPRE for the OFDM symbol is based at least in part on an EPRE differential between an NRS EPRE and a CRS EPRE; and transmit an indication of the NPDSCH EPRE to a UE.

In some aspects, a non-transitory computer-readable medium may store one or more instructions for wireless communication. The one or more instructions, when executed by one or more processors of a UE, may cause the one or more processors to determine, for an OFDM symbol that includes one or more CRS resource elements and one or more NPDSCH resource elements, an NPDSCH EPRE, wherein the NPDSCH EPRE for the OFDM symbol is based at least in part on an EPRE differential between an NRS EPRE and a CRS EPRE; and demodulate the OFDM symbol based at least in part on the NPDSCH EPRE.

In some aspects, a non-transitory computer-readable medium may store one or more instructions for wireless communication. The one or more instructions, when executed by one or more processors of a BS, may cause the one or more processors to determine, for an OFDM symbol that includes one or more CRS resource elements and one or more NPDSCH resource elements, an NPDSCH EPRE, wherein the NPDSCH EPRE for the OFDM symbol is based at least in part on an EPRE differential between an NRS EPRE and a CRS EPRE; and transmit an indication of the NPDSCH EPRE to a UE.

In some aspects, an apparatus for wireless communication may include means for determining, for an OFDM symbol that includes one or more CRS resource elements and one or more narrowband NPDSCH resource elements, an NPDSCH EPRE, wherein the NPDSCH EPRE for the OFDM symbol is based at least in part on an EPRE differential between an NRS EPRE and a CRS EPRE; and means for demodulating the OFDM symbol based at least in part on the NPDSCH EPRE.

In some aspects, an apparatus for wireless communication may include means for determining, for an OFDM symbol that includes one or more CRS resource elements and one or more NPDSCH resource elements, an NPDSCH EPRE, wherein the NPDSCH EPRE for the OFDM symbol is based at least in part on an EPRE differential between an NRS EPRE and a CRS EPRE; and means for transmitting an indication of the NPDSCH EPRE to a UE.

In some aspects, a method of wireless communication, performed by a UE, may include determining, for an OFDM symbol that includes one or more CRS resource elements and one or more NPDSCH resource elements, an NPDSCH EPRE, wherein the NPDSCH EPRE is different from an NPDSCH EPRE for OFDM symbols that include NPDSCH resource elements and NRS resource elements; and demodulating the OFDM symbol based at least in part on the NPDSCH EPRE.

In some aspects, a method of wireless communication, performed by a BS, may include determining, for an OFDM symbol that includes one or more CRS resource elements and one or more NPDSCH resource elements, an NPDSCH EPRE, wherein the NPDSCH EPRE is different from an NPDSCH EPRE for OFDM symbols that include NPDSCH resource elements and NRS resource elements; and transmitting an indication of the NPDSCH EPRE to a UE.

In some aspects, a UE for wireless communication may include a memory and one or more processors operatively coupled to the memory. The memory and the one or more processors may be configured to determine, for an OFDM symbol that includes one or more CRS resource elements and one or more NPDSCH resource elements, an NPDSCH EPRE, wherein the NPDSCH EPRE is different from an NPDSCH EPRE for OFDM symbols that include NPDSCH resource elements and NRS resource elements; and demodulate the OFDM symbol based at least in part on the NPDSCH EPRE.

In some aspects, a BS for wireless communication may include a memory and one or more processors operatively coupled to the memory. The memory and the one or more processors may be configured to determine, for an OFDM symbol that includes one or more CRS resource elements and one or more NPDSCH resource elements, an NPDSCH EPRE, wherein the NPDSCH EPRE is different from an NPDSCH EPRE for OFDM symbols that include NPDSCH resource elements and NRS resource elements; and transmit an indication of the NPDSCH EPRE to a UE.

In some aspects, a non-transitory computer-readable medium may store one or more instructions for wireless communication. The one or more instructions, when executed by one or more processors of a UE, may cause the one or more processors to determine, for an OFDM symbol that includes one or more CRS resource elements and one or more NPDSCH resource elements, an NPDSCH EPRE, wherein the NPDSCH EPRE is different from an NPDSCH EPRE for OFDM symbols that include NPDSCH resource elements and NRS resource elements; and demodulate the OFDM symbol based at least in part on the NPDSCH EPRE.

In some aspects, a non-transitory computer-readable medium may store one or more instructions for wireless communication. The one or more instructions, when executed by one or more processors of a BS, may cause the one or more processors to determine, for an OFDM symbol that includes one or more CRS resource elements and one or more NPDSCH resource elements, an NPDSCH EPRE, wherein the NPDSCH EPRE is different from an NPDSCH EPRE for OFDM symbols that include NPDSCH resource elements and NRS resource elements; and transmit an indication of the NPDSCH EPRE to a UE.

In some aspects, an apparatus for wireless communication may include means for determining, for an OFDM symbol that includes one or more CRS resource elements and one or more narrowband NPDSCH resource elements, an NPDSCH EPRE, wherein the NPDSCH EPRE is different from an NPDSCH EPRE for OFDM symbols that include NPDSCH resource elements and NRS resource elements; and means for demodulating the OFDM symbol based at least in part on the NPDSCH EPRE.

In some aspects, an apparatus for wireless communication may include means for determining, for an OFDM symbol that includes one or more CRS resource elements and one or more NPDSCH resource elements, an NPDSCH EPRE, wherein the NPDSCH EPRE is different from an NPDSCH EPRE for OFDM symbols that include NPDSCH resource elements and NRS resource elements; and means for transmitting an indication of the NPDSCH EPRE to a UE.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 9 is a diagram illustrating an example process performed, for example, by a BS, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
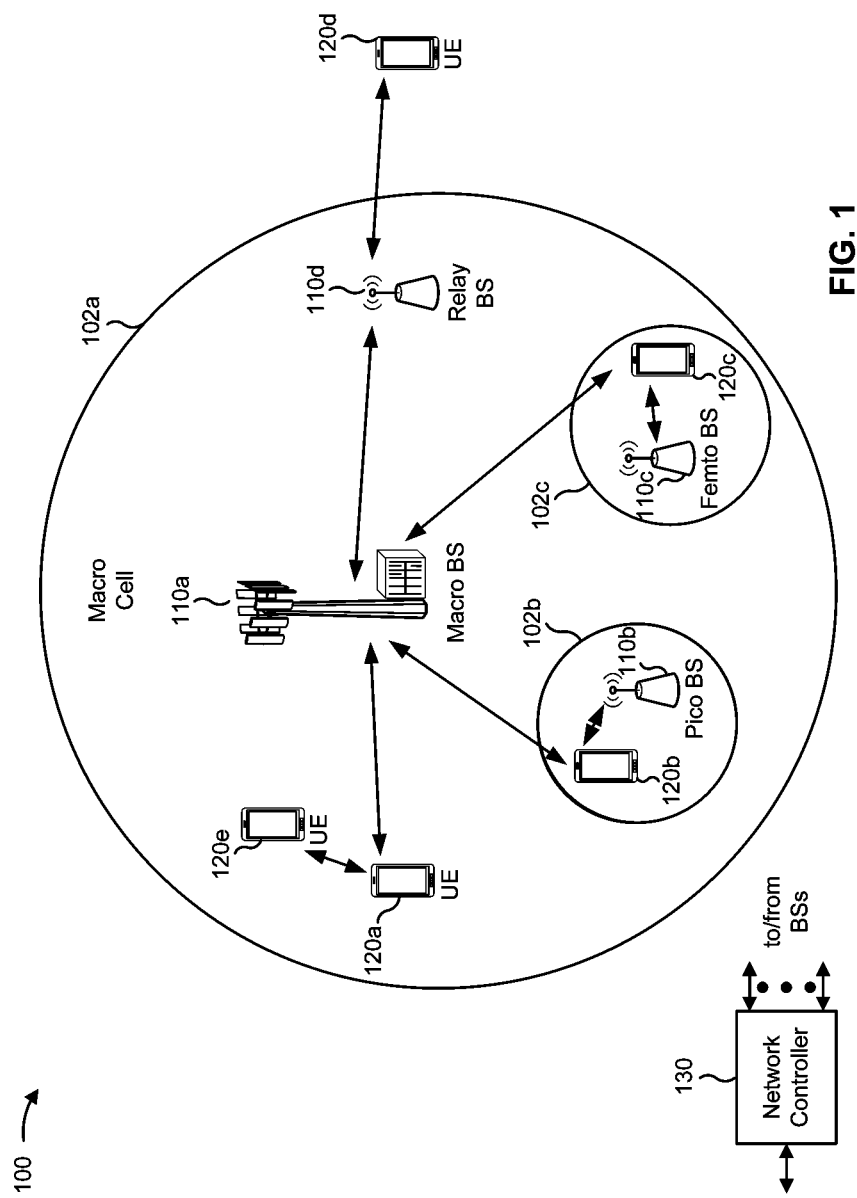
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
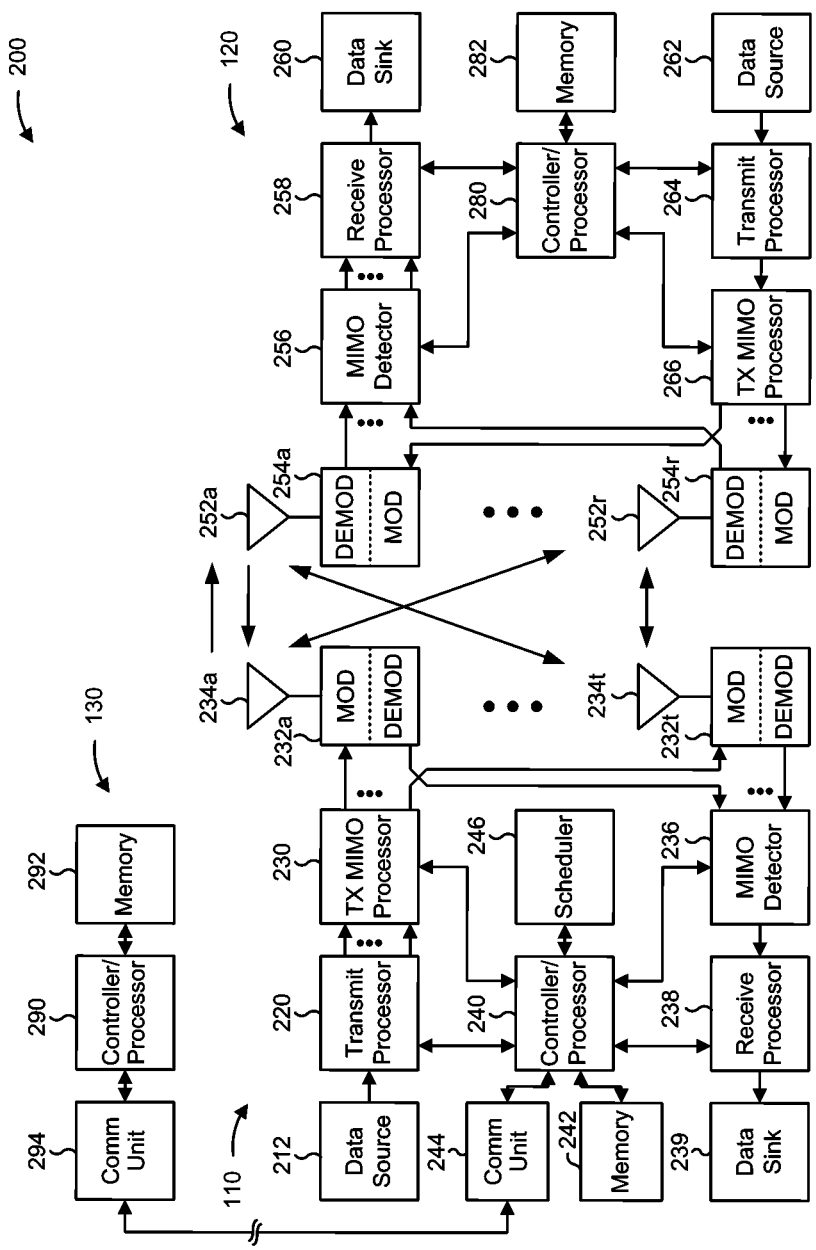
FIG. 2 is a diagram illustrating an example of a base station in communication with a UE in a wireless communication network, in accordance with various aspects of the present disclosure.

FIG. 2 is a diagram illustrating a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with determining an energy per resource element (EPRE) for a symbol including a cell-specific reference signal (CRS), as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, process 800 of FIG. 8, process 900 of FIG. 9, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6, process 700 of FIG. 7, process 800 of FIG. 8, process 900 of FIG. 9, and/or other processes as described herein. A scheduler 246 may schedule UEs for data transmission on the downlink and/or uplink.

In some aspects, UE 120 may include means for determining, for an orthogonal frequency division (OFDM) symbol that includes one or more CRS resource elements (REs) and one or more narrowband physical downlink shared channel (NPDSCH) resource elements, an NPDSCH EPRE, wherein the NPDSCH EPRE for the OFDM symbol is based at least in part on an EPRE differential between a narrowband reference signal (NRS) EPRE and a CRS EPRE, means for demodulating the OFDM symbol based at least in part on the NPDSCH EPRE, and/or the like. In some aspects, UE 120 may include determining, for an OFDM symbol that includes one or more CRS resource elements and one or more NPDSCH resource elements, an NPDSCH EPRE, wherein the NPDSCH EPRE is different from an NPDSCH EPRE for OFDM symbols that include NPDSCH resource elements and NRS resource elements, means for demodulating the OFDM symbol based at least in part on the NPDSCH EPRE, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining, for an OFDM symbol that includes one or more CRS and one or more NPDSCH resource elements, an NPDSCH EPRE, wherein the NPDSCH EPRE for the OFDM symbol is based at least in part on an EPRE differential between an NRS EPRE and a CRS EPRE, means for transmitting an indication of the NPDSCH EPRE to a UE, and/or the like. In some aspects, base station 110 may include means for determining, for an OFDM symbol that includes one or more CRS resource elements and one or more NPDSCH resource elements, an NPDSCH EPRE, wherein the NPDSCH EPRE is different from an NPDSCH EPRE for OFDM symbols that include NPDSCH resource elements and NRS resource elements, and wherein the NPDSCH EPRE for OFDM symbols that include NPDSCH resource elements and NRS resource elements is different from an NPDSCH EPRE for OFDM symbols that include only NPDSCH resource elements, means for transmitting an indication of the NPDSCH EPRE to a UE. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

FIGS. 3A-3D are diagrams illustrating examples 300 of an NPDSCH transmission, in accordance with various aspects of the present disclosure. An NPDSCH transmission may be a type of transmission that spans a narrow bandwidth, such as 180 kHz, 200 kHz, and/or the like. Narrowband transmissions may be used in NB-IoT deployments, in which a BS (e.g., BS 110) may perform NPDSCH transmissions to NB-IoT UEs (e.g., UEs 120) on an NB-IoT carrier in a narrowband cell (NCell). In some cases, the NB-IoT carrier may be in-band with a full-bandwidth carrier (e.g., an LTE carrier, an NR carrier, and/or the like) of a cell of the BS. In this case, the NCell is geographically located within a cell (e.g., a full-bandwidth cell) of the BS, and the operating frequency range of the NB-IoT carrier may be within the operating frequency of the full-bandwidth carrier of the BS.

As shown in FIGS. 3A-3D, an NPDSCH transmission may span one or more OFDM symbols of the NB-IoT carrier (e.g., OFDM symbols 0-13 and/or other OFDM symbols). As further shown in FIGS. 3A-3D, an NPDSCH transmission may include a plurality of NPDSCH resource elements, which are resource elements that carry the NPDSCH transmission.

As further shown in FIGS. 3A-3D, the NPDSCH transmission may be accompanied by one or more narrowband reference signals, which may be reference signals that are associated with the NCell of the BS. NRSs may be used by the UE and/or the BS to adjust and/or optimize modulation, demodulation, and/or decoding parameters for the NB-IoT carrier.

As further shown in FIGS. 3A-3D, if the NB-IoT carrier is configured to be in-band with the full-bandwidth carrier of the BS, the NPDSCH transmission may be accompanied by one or more cell-specific reference signals, which may be reference signals that are associated with the full-bandwidth cell of the BS. CRSs may be used by the UE and/or the BS to adjust and/or optimize modulation, demodulation, and/or decoding parameters for the full-bandwidth carrier.

Figure 3A:
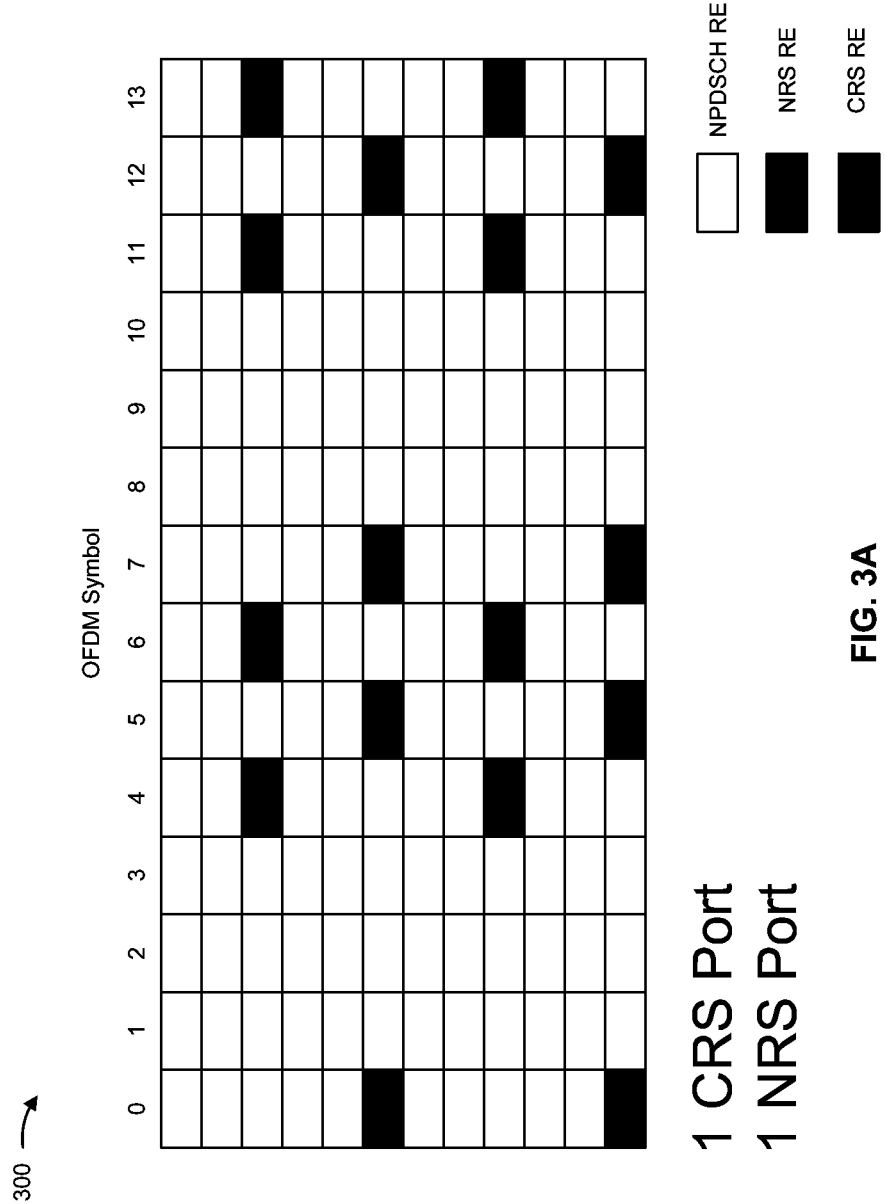
FIGS. 3A-3D are diagrams illustrating examples of narrowband physical downlink shared channel transmissions, in accordance with various aspects of the present disclosure.

As further shown in FIGS. 3A-3D, resource elements carrying the NPDSCH transmission, the NRSs, and the CRSs may be distributed across and/or within OFDM symbols. For example, and as shown in FIG. 3A, a subset of OFDM symbols may include frequency division multiplexed CRS resource elements and NPDSCH resource elements (e.g., OFDM symbols 0, 4, 7, and 11, which may be referred to as Type-$C_B$ OFDM symbols), a subset of OFDM symbols may include frequency division multiplexed NRS resource elements and NPDSCH resource elements (e.g., OFDM symbols 5, 6, 12, and 13, which may be referred to as Type-$N_B$ OFDM symbols), and a subset of OFDM symbols may include only NPDSCH resource elements (e.g., OFDM symbols 1-3 and 8-10, which may be referred to as Type-$N_A$ OFDM symbols).

The quantity of CRS resource elements, the quantity of NRS resource elements, and the quantity of NPDSCH resource elements included the OFDM symbols of an NPDSCH transmission may be based at least in part on a quantity of CRS ports configured by the BS and the quantity of NRS ports configured by the BS. FIG. 3A illustrates an example resource element configuration for an NPDSCH transmission to a UE configured with one CRS port and one NRS port (which, in some cases, may be referred to as a canonical configuration). In this example, the NPDSCH transmission may include four Type-$C_B$ OFDM symbols and four Type-$N_B$ OFDM symbols.

Figure 3B:
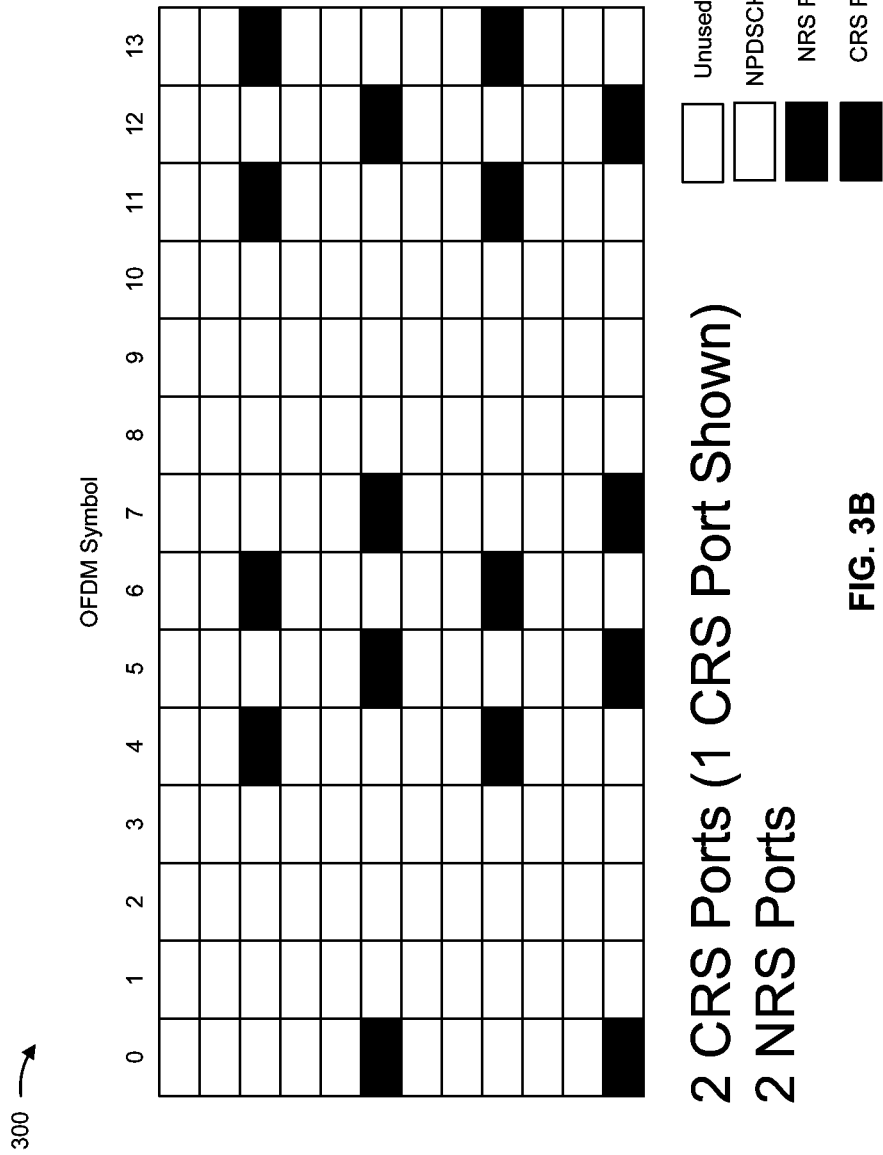

FIG. 3B illustrates an example resource element configuration for an NPDSCH transmission to a UE configured with two CRS ports and two NRS ports (which, in some cases, may also be referred to as a canonical configuration). In this example, the OFDM symbols that include CRS resource elements and NPDSCH resource elements (e.g., the Type-$C_B$ OFDM symbols) may include four CRS resource elements. The four CRS resource elements may be distributed across the two CRS ports such that each port is configured with two of the four CRS resource elements. Thus, from the perspective of one of the CRS ports, the two CRS resource elements assigned to the other CRS port are handled as unused, blank, or zero-power resource elements.

Similarly, the OFDM symbols that include NRS resource elements and NPDSCH resource elements (e.g., the Type-$N_B$ OFDM symbols) may include four NRS resource elements. The four NRS resource elements may be distributed across the two NRS ports such that each port is configured with two of the four NRS resource elements. Thus, from the perspective of one of the NRS ports, the two NRS resource elements assigned to the other NRS port are handled as unused, blank, or zero-power resource elements.

Figure 3C:
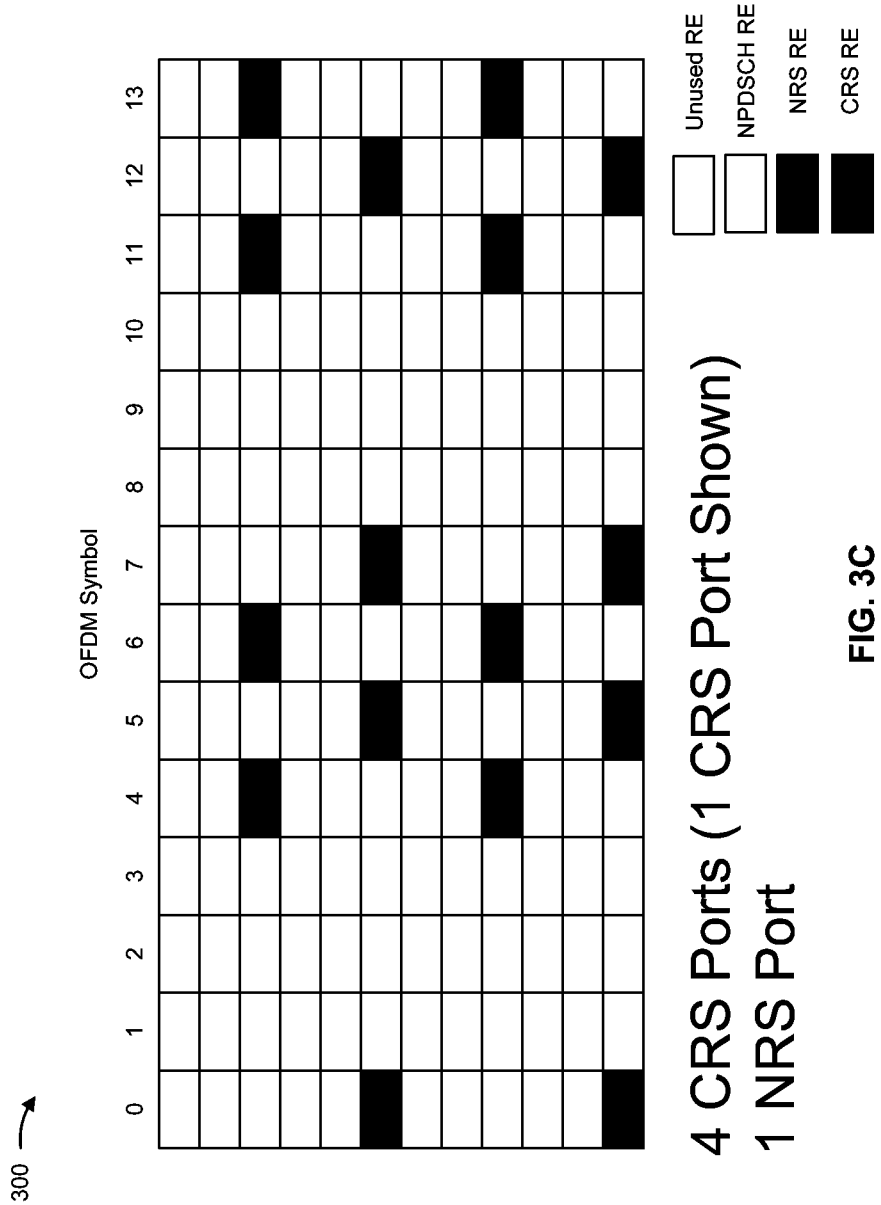

FIG. 3C illustrates an example resource element configuration for an NPDSCH transmission to a UE configured with four CRS ports and one NRS port. In this example, the NPDSCH transmission may include six Type-$C_B$ OFDM symbols (OFDM symbols 0, 1, 4, 7, 8, and 9) and four Type-$C_B$ OFDM symbols (OFDM symbols 5, 6, 12, and 13). Each Type-$C_B$ OFDM symbol may include four CRS resource elements. The OFDM symbols that include CRS resource elements and NPDSCH resource elements (e.g., the Type-$C_B$ OFDM symbols) may each include four CRS resource elements. The four CRS resource elements within a Type-$C_B$ OFDM symbol may be distributed across two of the four CRS ports such that each port is configured with two of the four CRS resource elements of the Type-$C_B$ OFDM symbol. Thus, from the perspective of one of the six CRS ports, the two CRS resource elements assigned to the other CRS port in the same Type-$C_B$ OFDM symbol, and the CRS resource elements in other Type-$C_B$ OFDM symbols assigned to other CRS ports (e.g., OFDM symbol 1 and 8), are handled as unused, blank, or zero-power resource elements. The OFDM symbols that include NRS resource elements and NPDSCH resource elements (e.g., the Type-$N_B$ OFDM symbols) may include two NRS resource elements and may be handled similarly as described above in connection with FIG. 3A.

Figure 3D:
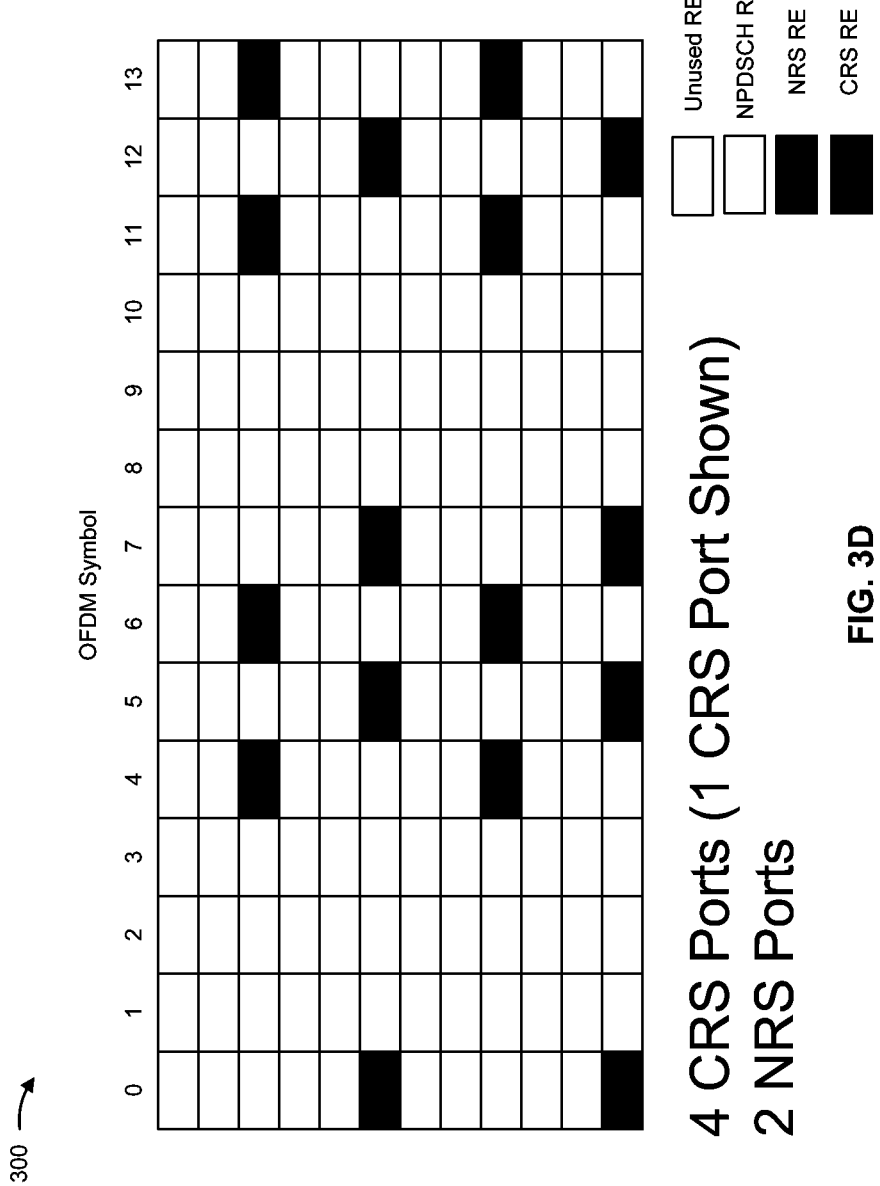

FIG. 3D illustrates an example resource element configuration for an NPDSCH transmission to a UE configured with four CRS ports and two NRS ports. In this example, each Type-$C_B$ OFDM symbol may include four CRS resource elements and may be handled similarly as described above in connection with FIG. 3C. Moreover, the OFDM symbols that include NRS resource elements and NPDSCH resource elements (e.g., the Type-$N_B$ OFDM symbols) may include four NRS resource elements and may be handled similarly as described above in connection with FIG. 3B.

As indicated above, FIGS. 3A-3D are provided as examples. Other examples may differ from what is described with respect to FIGS. 3A-3D.

In some cases, various types of modulation may be used in an NB-IoT deployment. For example, BSs and UEs (e.g., NB-IoT UEs) in an NB-IoT deployment may modulate and demodulate transmissions using quadrature phase-shift keying (QPSK), 16 quadrature amplitude modulation (16QAM), and/or the like. The performance of NPDSCH transmission detection in an NB-IoT deployment may be based at least in part on a UE's estimate of the transmit power levels of the NPDSCH transmission. While the increased alphabet of 16QAM may permit an increased amount of data to be transmitted on a carrier relative to QPSK, 16QAM may be more sensitive to the UE's estimate of the transmit power levels of the NPDSCH transmission, which may cause decreased NPDSCH transmission detection performance.

In some cases, the transmit power level of an NPDSCH transmission may be determined as an NPDSCH EPRE of the channel on which the NPDSCH transmission is performed. An NPDSCH EPRE may be determined per antenna port of a UE. In some cases, the UE may be configured to assume the same NPDSCH EPRE for different types of OFDM symbols for detection and demodulation. For example, the UE may be configured to use the NPDSCH EPRE determined for Type-$N_A$ OFDM symbols and/or Type-$N_B$ OFDM symbols as the NPDSCH EPRE for Type-$C_B$ OFDM symbols. However, the actual transmitted NPDSCH EPRE for NPDSCH resource elements may differ depending on the type of OFDM symbol for which the NPDSCH EPRE is being determined. For example, the NPDSCH EPRE for NPDSCH resource elements in Type-$C_B$ OFDM symbols may differ from the NPDSCH EPRE for NPDSCH resource elements in Type-$N_A$ OFDM symbol and in Type-$N_B$ OFDM symbols due to the different in transmit power levels for NRSs, CRSs, and NPDSCHs. This may result in a mismatch between the assumed NPDSCH EPRE for Type-$C_B$ OFDM symbols and the actual NPDSCH EPRE transmitted in Type-$C_B$ OFDM symbols, which in turn may result in degraded NPDSCH detection and demodulation performance in Type-$C_B$ OFDM symbols (particularly where 16QAM is used).

Some aspects described herein provide techniques and apparatuses for determining an EPRE for a symbol including a CRS. In some aspects, a BS and/or a UE may determine or estimate an NPDSCH EPRE for an NPDSCH transmission in a Type-$C_B$ OFDM symbol (e.g., an OFDM symbol including NPDSCH resource elements and CRS resource elements) as opposed to assuming or using an NPDSCH EPRE determined for other types of OFDM symbols, which increases the accuracy of the NPDSCH EPRE used for detection and demodulation of Type-$C_B$ OFDM symbols. The UE and/or the BS may determine or estimate an NPDSCH EPRE for a Type-$C_B$ OFDM symbol based at least in part on various parameters, such as an NRS EPRE, an EPRE differential between the NRS EPRE and a CRS EPRE, a quantity of CRS ports and a quantity of NRS ports configured by the BS, whether the NCell and the full-bandwidth cell of the BS are associated with the same primary cell identifier (PCI) (and thus, is an in-band deployment), the type of modulation that is used for the NPDSCH transmission, and/or the like.

Figure 4:
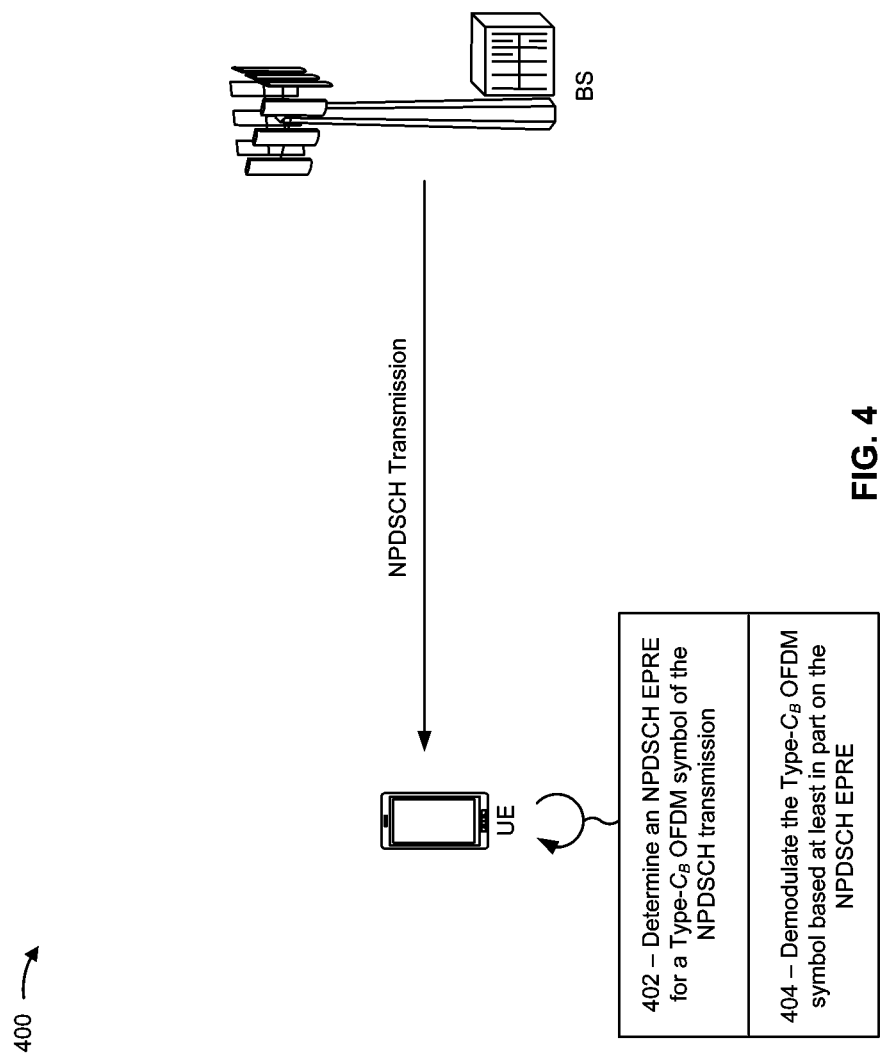
FIGS. 4 and 5 are diagrams illustrating examples of determining an energy per resource element for a symbol including a cell-specific reference signal, in accordance with various aspects of the present disclosure.

FIG. 4 is a diagram illustrating an example 400 of determining an EPRE for a symbol including a CRS, in accordance with various aspects of the present disclosure. As shown in FIG. 4, example 400 may include communication between a UE (e.g., UE 120) and a BS (e.g., BS 110). The UE and the BS may be included in a wireless network, such as wireless network 100. The UE and the BS may communicate via an access link, which may include an uplink and a downlink. In some aspects, the UE may be an IoT device, an NB-IoT UE, and/or another type of device or UE that is capable of communicating via a narrowband carrier.

In some aspects, the BS may provide coverage for the UE in various cells. The cells may include a full-bandwidth cell in which the UE and the BS may communicate via a full-bandwidth carrier, an NCell in which the UE and the BS may communicate via a narrowband carrier (e.g., an NB-IoT carrier), and/or the like. In some aspects, the NCell may be deployed in-band with the full-bandwidth cell such that the NB-IoT carrier is included in the frequency range of the full-bandwidth carrier. In these examples, NPDSCH transmissions from the BS may be frequency division multiplexed in various OFDM symbols with CRSs or NRSs transmitted from the BS. Accordingly, to increase the performance of NPDSCH detection and demodulation, the BS may determine an NPDSCH EPRE for OFDM symbols that include various combinations of resource elements (e.g., only NPDSCH resource elements, frequency division multiplexed NPDSCH resource elements and CRS resource elements, frequency division multiplexed NPDSCH resource elements and NRS resource elements, and/or the like).

As shown in FIG. 4, and by reference number 402, the UE may determine an NPDSCH EPRE for a Type-$C_B$ OFDM symbol (e.g., an OFDM symbol in which NPDSCH resource elements and CRS resource elements are frequency division multiplexed) of an NPDSCH transmission transmitted from the BS. The UE may determine the actual or estimated NPDSCH EPRE for the Type-$C_B$ OFDM symbol (and other Type-$C_B$ OFDM symbols) as opposed to using an NPDSCH EPRE for another type of OFDM symbol (e.g., a Type-$N_A$ OFDM symbol or a Type-$N_B$ OFDM symbol) to increase the accuracy of the NPDSCH EPRE for the Type-$C_B$ OFDM symbol.

In some aspects, the UE may determine the NPDSCH EPRE for the Type-$C_B$ OFDM symbol regardless of the type of modulation that is used for the NPDSCH transmission, or may determine the NPDSCH EPRE for the Type-$C_B$ OFDM symbol based at least in part on 16QAM being used to modulate the NPDSCH transmission. In some aspects, the UE may determine the NPDSCH EPRE for the Type-$C_B$ OFDM symbol based at least in part on receiving signaling from the BS to determine the NPDSCH EPRE for the Type-$C_B$ OFDM symbol.

In some aspects, the UE may receive, from the BS, an indication of the NPDSCH EPRE for the Type-$C_B$ OFDM symbol. In these examples, the UE may the UE may determine the NPDSCH EPRE for the Type-$C_B$ OFDM symbol based at least in part on the indication of the NPDSCH EPRE for the Type-$C_B$ OFDM symbol received from the BS. In these examples, if the BS determines the NPDSCH EPRE for the Type-$C_B$ OFDM symbol, the BS may determine the NPDSCH EPRE for the Type-$C_B$ OFDM symbol based at least in part on the CRS port virtualization mapping between the CRS ports and the NRS port(s).

In some aspects, the UE may determine the NPDSCH EPRE for the Type-$C_B$ OFDM symbol based at least in part on various parameters that are configured at the UE and/or signaled to the UE. In some aspects, the BS may signal the indication of the NPDSCH EPRE for the Type-$C_B$ OFDM symbol to the UE in scenarios where the NCell and the full-bandwidth cell are associated with different PCIs, and the UE may determine the NPDSCH EPRE for the Type-$C_B$ OFDM symbol based at least in part on the various parameters in scenarios where the NCell and the full-bandwidth cell are associated with the same PCI.

In some aspects, the various parameters may include an NRS EPRE for NRS transmissions from the BS, an EPRE differential between the NRS EPRE and a CRS EPRE for CRS transmissions from the BS, a quantity of CRS ports configured by the BS, a quantity of NRS ports configured by the BS, whether the NCell and the full-bandwidth cell of the BS are associated with the same PCI, the type of modulation used to modulate the NPDSCH transmission, whether the CRS ports of the UE are virtualized (e.g., combined to form the NRS ports of the UE) and the virtualization configuration, and/or the like. In some aspects, the UE may determine the NPDSCH EPRE for the Type-$C_B$ OFDM symbol based at least in part on a ratio of the NPDSCH EPRE for the Type-$C_B$ OFDM symbol and the NRS EPRE. The ratio may be based at least in part on the EPRE differential between the NRS EPRE and the CRS EPRE for the BS.

In some aspects, the UE may determine the NPDSCH EPRE for the Type-$C_B$ OFDM symbol in examples where the NCell and the full-bandwidth cell are associated with the same PCI, which may include examples where the UE is configured with a canonical configuration of CRS ports and NRS ports (e.g., where the UE is configured with the same quantity of CRS ports and NRS ports, such as one NRS port and one CRS port, two NRS ports and two CRS ports, and/or the like). For example, if the UE is configured with one NRS port and one CRS port (and thus, the NPDSCH transmission may be similar to the example NPDSCH transmission illustrated and described above in connection with FIG. 3A), the UE may determine the ratio of the NPDSCH EPRE for the Type-$C_B$ OFDM symbol and the NRS EPRE for the CRS port based at least in part on Formula 1:

$$\frac{EPRE_{NPDSCH}^{C_B}}{EPRE_{NRS}} = \frac{1}{5}\left(6 - \frac{1}{EPRE_{NRS-CRS}}\right) \quad \text{Formula 1}$$

where $EPRE_{NPDSCH}^{C_B}$ represents the NPDSCH EPRE for the Type-$C_B$ OFDM symbol, $EPRE_{NRS}$ represents the NRS EPRE, and $EPRE_{NRS-CRS}$ represents the EPRE differential between the NRS EPRE and the CRS EPRE for the BS.

As another example, if the UE is configured with two NRS ports and two CRS ports (and thus, the NPDSCH transmission may be similar to the example NPDSCH transmission illustrated and described above in connection with FIG. 3B), the UE may determine the ratio of the NPDSCH EPRE for the Type-$C_B$ OFDM symbol and the NRS EPRE based at least in part on Formula 2:

$$\frac{EPRE_{NPDSCH}^{C_B}}{EPRE_{NRS}} = \frac{1}{4}\left(3 - \frac{1}{EPRE_{NRS-CRS}}\right) \quad \text{Formula 2}$$

In this example, the UE may determine the ratio of the NPDSCH EPRE for the Type-$C_B$ OFDM symbol and the NRS EPRE, and thus the NPDSCH EPRE for the Type-$C_B$ OFDM symbol, for each of the two CRS ports based at least in part on Formula 2. For example, the UE may determine a first NPDSCH EPRE for the Type-$C_B$ OFDM symbol for the first CRS port based at least in part on Formula 2, and may determine a second NPDSCH EPRE for the Type-$C_B$ OFDM symbol for the second CRS port based at least in part on Formula 2.

In some aspects, the NCell and the full-bandwidth cell may be associated with different PCIs in examples where the UE is configured with different quantities of CRS ports and NRS ports (e.g., one NRS port and four CRS ports, two NRS ports and four CRS ports, and/or the like). In these examples, the UE may determine the NPDSCH EPRE for the Type-$C_B$ OFDM symbol.

As an example, if the UE is configured with one NRS port and four CRS ports (and thus, the NPDSCH transmission may be similar to the example NPDSCH transmission illustrated and described above in connection with FIG. 3C), the UE may determine the ratio of the NPDSCH EPRE for the Type-$C_B$ OFDM symbol and the NRS EPRE based at least in part on Formula 3:

$$\frac{EPRE_{NPDSCH}^{C_B}}{EPRE_{NRS}} = \frac{1}{2}\left(3 - \frac{2}{EPRE_{NRS-CRS}}\right) \quad \text{Formula 3}$$

In this example, the UE may determine the ratio of the NPDSCH EPRE for the Type-$C_B$ OFDM symbol and the NRS EPRE, and thus the NPDSCH EPRE for the Type-$C_B$ OFDM symbol, for each of the four CRS ports based at least in part on Formula 3. Because the four CRS ports are virtualized into the one NRS port, $EPRE_{NBS\text{-}CBS}$ may be determined as $$EPRE_{NRS-CRS} = \frac{4 \times P_{NRS}}{P_{CRS}},$$

where $P_{NRS}$ and $P_{CRS}$ are the quantity of NRS ports and the quantity of CRS ports, respectively. Moreover, in this example, Type-$C_B$ OFDM symbols may be further subdivided into two "subtypes" that have the same value of $EPRE_{NPDSCH}^{C_B}$.

As another example, if the UE is configured with two NRS ports and four CRS ports (and thus, the NPDSCH transmission may be similar to the example NPDSCH transmission illustrated and described above in connection with FIG. 3D), the UE may determine the ratio of the NPDSCH EPRE for the Type-$C_B$ OFDM symbol and the NRS EPRE based at least in part on Formula 4:

$$\frac{EPRE_{NPDSCH}^{C_B}}{EPRE_{NRS}} = \frac{1}{4}\left(3 - \frac{2}{EPRE_{NRS-CRS}}\right) \quad \text{Formula 4}$$

In this example, the UE may determine the ratio of the NPDSCH EPRE for the Type-$C_B$ OFDM symbol and the NRS EPRE, and thus the NPDSCH EPRE for the Type-$C_B$ OFDM symbol, for each of the four CRS ports based at least in part on Formula 4. Because the four CRS ports are virtualized into the two NRS ports, $EPRE_{NBS\text{-}CBS}$ may be determined as $$EPRE_{NRS-CRS} = \frac{2 \times P_{NRS}}{P_{CRS}},$$

where $P_{NRS}$ and $P_{CRS}$ are the quantity of NRS ports and the quantity of CRS ports, respectively. Moreover, in this example, Type-$C_B$ OFDM symbols may be further subdivided into two "subtypes" that have the same value of $EPRE_{NPDSCH}^{C_B}$.

In some aspects, the UE may determine the NPDSCH EPRE for the Type-$C_B$ OFDM symbol based at least in part on a ratio between the NPDSCH EPRE for the Type-$C_B$ OFDM symbol and an NPDSCH EPRE for a Type-$N_A$ OFDM symbol of the NPDSCH transmission (e.g., an OFDM symbol including only NPDSCH resource elements). For example, if the UE is configured with one NRS port and one CRS port (and thus, the NPDSCH transmission may be similar to the example NPDSCH transmission illustrated and described above in connection with FIG. 3A), the UE may determine the ratio of the NPDSCH EPRE for the Type-$C_B$ OFDM symbol and the NPDSCH EPRE for a Type-$N_A$ OFDM symbol based at least in part on Formula 5:

$$\frac{EPRE_{NPDSCH}^{C_B}}{EPRE_{NPDSCH}^{N_A}} = \frac{1}{5}\left(6 - \frac{1}{EPRE_{NRS-CRS}}\right) \quad \text{Formula 5}$$

where $EPRE_{NPDSCH}^{N_A}$ represents the NPDSCH EPRE for a Type-$N_A$ OFDM symbol.

As another example, if the UE is configured with two NRS ports and two CRS ports (and thus, the NPDSCH transmission may be similar to the example NPDSCH transmission illustrated and described above in connection with FIG. 3B), the UE may determine the ratio of the NPDSCH EPRE for the Type-$C_B$ OFDM symbol and the NPDSCH EPRE for a Type-$N_A$ OFDM symbol for each CRS port based at least in part on Formula 6:

$$\frac{EPRE_{NPDSCH}^{C_B}}{EPRE_{NPDSCH}^{N_A}} = \frac{1}{2}\left(3 - \frac{1}{EPRE_{NRS-CRS}}\right) \quad \text{Formula 6}$$

As another example, if the UE is configured with one NRS port and four CRS ports (and thus, the NPDSCH transmission may be similar to the example NPDSCH transmission illustrated and described above in connection with FIG. 3C), the UE may determine the ratio of the NPDSCH EPRE for the Type-$C_B$ OFDM symbol and the NPDSCH EPRE for a Type-$N_A$ OFDM symbol for each CRS port based at least in part on Formula 7:

$$\frac{EPRE_{NPDSCH}^{C_B}}{EPRE_{NPDSCH}^{N_A}} = \frac{1}{2}\left(3 - \frac{2}{EPRE_{NRS-CRS}}\right) \quad \text{Formula 7}$$

As another example, if the UE is configured with two NRS ports and four CRS ports (and thus, the NPDSCH transmission may be similar to the example NPDSCH transmission illustrated and described above in connection with FIG. 3D), the UE may determine the ratio of the NPDSCH EPRE for the Type-$C_B$ OFDM symbol and the NPDSCH EPRE for a Type-$N_A$ OFDM symbol for each CRS port based at least in part on Formula 8:

$$\frac{EPRE_{NPDSCH}^{C_B}}{EPRE_{NPDSCH}^{N_A}} = \frac{1}{2}\left(3 - \frac{2}{EPRE_{NRS-CRS}}\right) \quad \text{Formula 8}$$

In some aspects, one or more of the above-described parameters and/or other parameters may be configured in a table, a specification, an electronic file, a standard and/or the like, and may be programmed, configured, and/or hard-coded for the UE. In some aspects, one or more of the above-described parameters and/or other parameters may be signaled to the UE in one or more downlink communications, such as one or more radio resource control (RRC) communications, one or more medium access control control element (MAC-CE) communications, one or more downlink control information (DCI) communications, and/or the like. In some aspects, various combinations of the above-described parameters and/or other parameters may be configured for the UE via a combination of signaling and programming.

As an example, Formulas 1-4 may be signaled to or configured at the UE in a table such as example Table 1:

TABLE 1

| | | $\frac{EPRE_{NPDSCH}^{C_B}}{EPRE_{NRS}}$ | |
|---|---|---|---|
| | 1 CRS port | 2 CRS ports | 4 CRS ports |
| 1 NRS port | $\frac{1}{5}\left(6 - \frac{1}{EPRE_{NRS-CRS}}\right)$ | Not Applicable | $\frac{1}{2}\left(3 - \frac{2}{EPRE_{NRS-CRS}}\right)$ |
| 2 NRS ports | Not Applicable | $\frac{1}{4}\left(3 - \frac{1}{EPRE_{NRS-CRS}}\right)$ | $\frac{1}{4}\left(3 - \frac{2}{EPRE_{NRS-CRS}}\right)$ |

In these examples, the UE may determine the NPDSCH EPRE for the Type-$C_B$ OFDM symbol by identifying the appropriate formula in Table 1 based at least in part on the quantity of CRS ports and the quantity of NRS ports, and by determining the NPDSCH EPRE for the Type-$C_B$ OFDM symbol based at least in part on the identified formula.

As another example, Formulas 5-8 may be signaled to or configured at the UE in a table such as example Table 2:

TABLE 2

| | | $\frac{EPRE_{NPDSCH}^{C_B}}{EPRE_{NPDSCH}^{N_A}}$ | |
|---|---|---|---|
| | 1 CRS port | 2 CRS ports | 4 CRS ports |
| 1 NRS port | $\frac{1}{5}\left(6 - \frac{1}{EPRE_{NRS-CRS}}\right)$ | Not Applicable | $\frac{1}{2}\left(3 - \frac{2}{EPRE_{NRS-CRS}}\right)$ |
| 2 NRS ports | Not Applicable | $\frac{1}{2}\left(3 - \frac{1}{EPRE_{NRS-CRS}}\right)$ | $\frac{1}{2}\left(3 - \frac{2}{EPRE_{NRS-CRS}}\right)$ |

In these examples, the UE may determine the NPDSCH EPRE for the Type-$C_B$ OFDM symbol by identifying the appropriate formula in Table 2 based at least in part on the quantity of CRS ports and the quantity of NRS ports, and by determining the NPDSCH EPRE for the Type-$C_B$ OFDM symbol based at least in part on the identified formula.

In some aspects, the EPRE differential between the NRS EPRE and the CRS EPRE for the BS (e.g., $EPRE_{NRS-CRS}$) may be based at least in part on NPDSCH EPRE for Type-$N_B$ OFDM symbols (e.g., OFDM symbols that include NPDSCH resource elements and NRS resource elements, represented by $EPRE_{NPDSCH}^{N_B}$). In some aspects, $EPRE_{NPDSCH}^{N_A}$ and $EPRE_{NPDSCH}^{N_B}$ may be the same value. In some aspects, $EPRE_{NPDSCH}^{N_A}$ and $EPRE_{NPDSCH}^{N_B}$ may be different values. In these examples, the BS and/or the UE may be configured with Table 3 (or a specification, an electronic file, and/or another type of data structure), which may specify various values for the ratio of $EPRE_{NPDSCH}^{N_A}$ and $EPRE_{NPDSCH}^{N_B}$ that depend on whether (and the level of) a power boost is applied to NRS resource elements and the quantity of NRS ports configured by the BS:

TABLE 3

| Power Boost for NRS | $\frac{EPRE_{NPDSCH}^{N_B}}{EPRE_{NPDSCH}^{N_A}}$ | |
|---|---|---|
| | One NRS Port | Two NRS Ports |
| Boost_0 | Value_0_1 | Value_0_2 |
| Boost_1 | Value_1_1 | Value_1_2 |
| Boost_2 | Value_2_1 | Value_2_2 |
| Boost_3 | Value_3_1 | Value_3_2 |

In some aspects, the values for the ratio may be selected to satisfy per-antenna port power constrains for the UE. In some aspects, Table 3 (or another type of table, specification, electronic file, or data structure specifying various values for the ratio of $EPRE_{NPDSCH}^{N_A}$ and $EPRE_{NPDSCH}^{N_B}$) may be used in OFDM symbols that are 16QAM modulated. In some aspects, Table 3 (or another type of table, specification, electronic file, or data structure specifying various values for the ratio of $EPRE_{NPDSCH}^{N_A}$ and $EPRE_{NPDSCH}^{N_B}$) may be used in OFDM symbols that are transmitted in a non-anchor NB-IoT carrier for the UE. In some aspects, the BS may transmit a communication indicating Table 3 (or another type of table, specification, electronic file, or data structure specifying various values for the ratio of $EPRE_{NPDSCH}^{N_A}$ and $EPRE_{NPDSCH}^{N_B}$) and indicating one or more non-anchor NB-IoT carriers for 16QAM transmission on which the specified ratios may be used.

As further shown in FIG. 4, and by reference number 404, the UE may demodulate the Type-$C_B$ OFDM symbol of the NPDSCH transmission based at least in part on the NPDSCH EPRE determined by the UE. Moreover, the UE may demodulate other Type-$C_B$ OFDM symbols of the NPDSCH transmission based at least in part on the NPDSCH EPRE (e.g., determined by the UE or the BS).

In this way, the UE may determine or estimate an NPDSCH EPRE for an NPDSCH transmission in a Type-$C_B$ OFDM symbol (e.g., an OFDM symbol including NPDSCH resource elements and CRS resource elements) as opposed to assuming or using an NPDSCH EPRE determined for other types of OFDM symbols, which increases the accuracy of the NPDSCH EPRE used for detection and demodulation of Type-$C_B$ OFDM symbols.

As indicated above, FIG. 4 is provided as an example. Other examples may differ from what is described with respect to FIG. 4.

Figure 5:
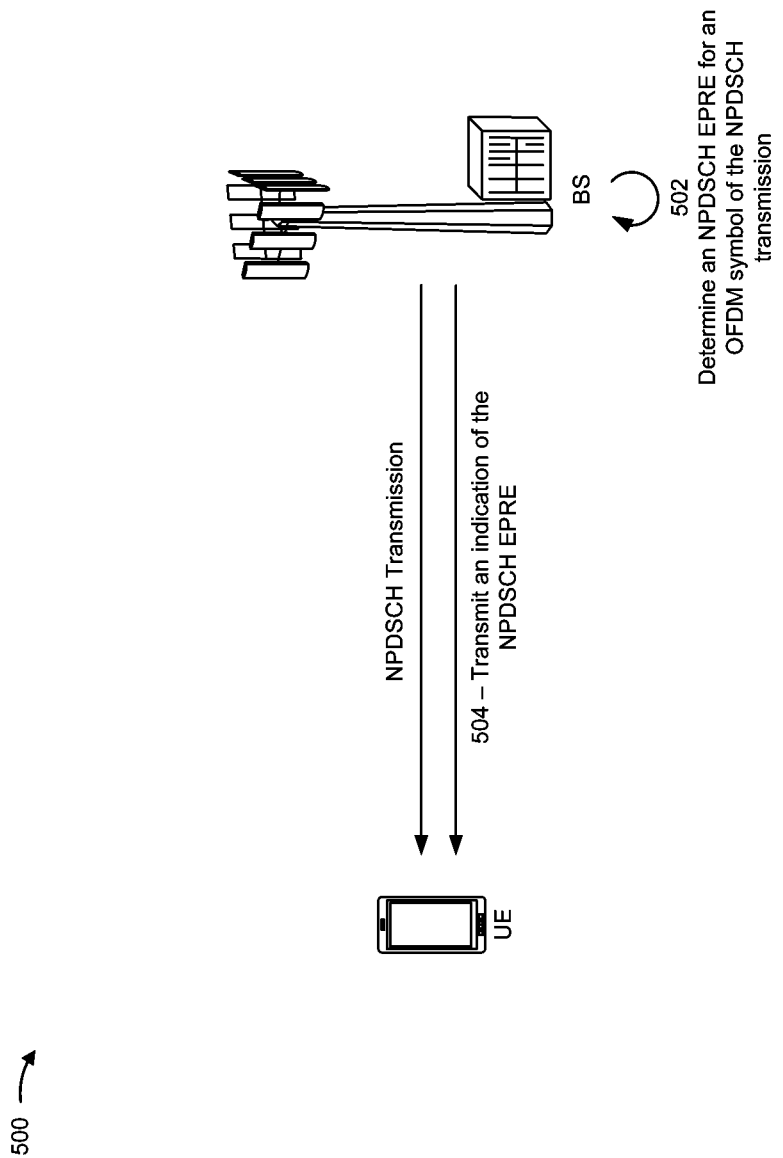

FIG. 5 is a diagram illustrating an example 500 of determining an EPRE for a symbol including a CRS, in accordance with various aspects of the present disclosure. As shown in FIG. 5, example 500 may include communication between a UE (e.g., UE 120) and a BS (e.g., BS 110). The UE and the BS may be included in a wireless network, such as wireless network 100. The UE and the BS may communicate via an access link, which may include an uplink and a downlink. In some aspects, the UE may be an IoT device, an NB-IoT UE, and/or another type of device or UE that is capable of communicating via a narrowband carrier.

In some aspects, the BS may provide coverage for the UE in various cells. The cells may include a full-bandwidth cell in which the UE and the BS may communicate via a full-bandwidth carrier, an NCell in which the UE and the BS may communicate via a narrowband carrier (e.g., an NB-IoT carrier), and/or the like. In some aspects, the NCell may be deployed in-band with the full-bandwidth cell such that the NB-IoT carrier is included in the frequency range of the full-bandwidth carrier. In these examples, NPDSCH transmissions from the BS may be frequency division multiplexed in various OFDM symbols with CRSs or NRSs transmitted from the BS. Accordingly, to increase the performance of NPDSCH detection and demodulation, the BS may determine an NPDSCH EPRE for OFDM symbols that include various combinations of resource elements (e.g., only NPDSCH resource elements, frequency division multiplexed NPDSCH resource elements and CRS resource elements, frequency division multiplexed NPDSCH resource elements and NRS resource elements, and/or the like).

As shown in FIG. 5, and by reference number 502, the BS may determine an NPDSCH EPRE for a Type-$C_B$ OFDM symbol (e.g., an OFDM symbol in which NPDSCH resource elements and CRS resource elements are frequency division multiplexed) of an NPDSCH transmission transmitted from the BS. The BS may determine the actual or estimated NPDSCH EPRE for the Type-$C_B$ OFDM symbol (and other Type-$C_B$ OFDM symbols) so that the UE may use the actual or estimated NPDSCH EPRE for the Type-$C_B$ OFDM symbol as opposed to using an NPDSCH EPRE for another type of OFDM symbol (e.g., a Type-$N_A$ OFDM symbol or a Type-$N_B$ OFDM symbol) to increase the accuracy of the NPDSCH EPRE for the Type-$C_B$ OFDM symbol.

In some aspects, The BS may determine the NPDSCH EPRE for the Type-$C_B$ OFDM symbol based at least in part on various parameters, such as an NRS EPRE for NRS transmissions from the BS, an EPRE differential between the NRS EPRE and a CRS EPRE for CRS transmissions from the BS, a quantity of CRS ports configured by the BS, a quantity of NRS ports configured by the BS, whether the NCell and the full-bandwidth cell of the BS are associated with the same PCI, the type of modulation used to modulate the NPDSCH transmission, whether the CRS ports of the UE are virtualized (e.g., combined to form the NRS ports of the UE) and the virtualization configuration, and/or the like. In some aspects, the BS may determine the NPDSCH EPRE for the Type-$C_B$ OFDM symbol using one or more of the techniques described above in connection with FIG. 4.

In some aspects, the BS may determine the NPDSCH EPRE for the Type-$C_B$ OFDM symbol based at least in part on using one or more of the various parameters described above in a formula. For example, the BS may determine the NPDSCH EPRE for the Type-$C_B$ OFDM symbol based at least in part on using one or more of the various parameters described above in any of Formulas 1-8 described above in connection with FIG. 4. In some aspects, the BS may identify the formula in a table, such as Table 1 described above in connection with FIG. 4, Table 2 described above in connection with FIG. 4, and/or another table.

In some aspects, the BS may determine the NPDSCH EPRE for the Type-$C_B$ OFDM symbol regardless of the type of modulation that is used for the NPDSCH transmission, or may determine the NPDSCH EPRE for the Type-$C_B$ OFDM symbol based at least in part on 16QAM being used to modulate the NPDSCH transmission. In some aspects, the BS may determine the NPDSCH EPRE for the Type-$C_B$ OFDM symbol in examples where the NCell and the full-bandwidth cell of the BS are associated with different PCIs.

As further shown in FIG. 5, and by reference number 504, the UE may transmit an indication of the NPDSCH EPRE for the Type-$C_B$ OFDM symbol to the UE. In some aspects, the BS may transmit the indication of the NPDSCH EPRE for the Type-$C_B$ OFDM symbol in a downlink communication, such as an RRC communication, a MAC-CE communication, a DCI communication, and/or the like.

In this way, the BS may determine or estimate an NPDSCH EPRE for an NPDSCH transmission in a Type-$C_B$ OFDM symbol (e.g., an OFDM symbol including NPDSCH resource elements and CRS resource elements) as opposed to assuming or using an NPDSCH EPRE determined for other types of OFDM symbols, which increases the accuracy of the NPDSCH EPRE used for detection and demodulation of Type-$C_B$ OFDM symbols.

As indicated above, FIG. 5 is provided as an example. Other examples may differ from what is described with respect to FIG. 5.

Figure 6:
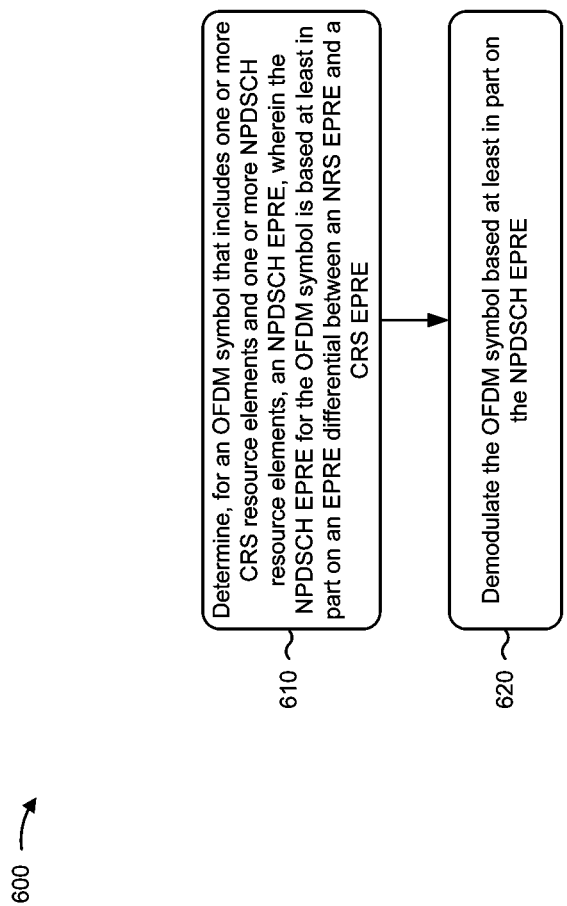
FIG. 6 is a diagram illustrating an example process performed, for example, by a UE, in accordance with various aspects of the present disclosure.

FIG. 6 is a diagram illustrating an example process 600 performed, for example, by a UE, in accordance with various aspects of the present disclosure. Example process 600 is an example where the UE (e.g., the UE 120 illustrated and described in connection with FIGS. 1 and 2, the UE described in connection with FIGS. 3A-3C, the UE illustrated and described in connection with FIGS. 4 and/or 5, and/or the like) performs operations associated with determining an EPRE for a symbol including a CRS.

As shown in FIG. 6, in some aspects, process 600 may include determining, for an OFDM symbol that includes one or more CRS resource elements and one or more NPDSCH resource elements, an NPDSCH EPRE, wherein the NPDSCH EPRE for the OFDM symbol is based at least in part on an EPRE differential between an NRS EPRE and a CRS EPRE (block 610). For example, the UE (e.g., using receive processor 258, transmit processor 264, controller/processor 280, memory 282, and/or the like) may determine, for an OFDM symbol that includes one or more CRS resource elements and one or more NPDSCH resource elements, an NPDSCH EPRE, as described above. In some aspects, the NPDSCH EPRE for the OFDM symbol is based at least in part on an EPRE differential between an NRS EPRE and a CRS EPRE.

As further shown in FIG. 6, in some aspects, process 600 may include demodulating the OFDM symbol based at least in part on the NPDSCH EPRE (block 620). For example, the UE (e.g., using receive processor 258, transmit processor 264, controller/processor 280, memory 282, and/or the like) may demodulate the OFDM symbol based at least in part on the NPDSCH EPRE, as described above.

Process 600 may include additional aspects, such as any single aspect or any combination of aspects described below and/or in connection with one or more other processes described elsewhere herein.

In a first aspect, the NPDSCH EPRE for the OFDM symbol is based at least in part on at least one of a quantity of CRS ports configured by the BS, a quantity of NRS ports configured by the BS, or whether a narrowband cell is an in-band deployment and is associated with a same PCI as a full-bandwidth cell associated with a CRS transmitted in the one or more CRS resource elements. In a second aspect, alone or in combination with the first aspect, determining the NPDSCH EPRE for the OFDM symbol comprises determining the NPDSCH EPRE for the OFDM symbol based at least in part on the EPRE differential and at least one of the quantity of CRS ports configured by the BS, the quantity of NRS ports configured by the BS, or whether the narrowband cell is associated with the same PCI as the full-bandwidth cell associated with the CRS transmitted in the one or more CRS resource elements.

In a third aspect, alone or in combination with one or more of the first and second aspects, the narrowband cell is associated with the same PCI as the full-bandwidth cell associated with the CRS transmitted in the one or more CRS resource elements. In a fourth aspect, alone or in combination with one or more of the first through third aspects, the quantity of CRS ports and the quantity of NRS ports are a same quantity. In a fifth aspect, alone or in combination with one or more of the first through fourth aspects, the quantity of CRS ports is two CRS ports and the quantity of NRS ports is two NRS ports, and determining the NPDSCH EPRE for the OFDM symbol comprises determining a first NPDSCH EPRE for a first CRS port of the two CRS ports; and determining a second NPDSCH EPRE for a second CRS port of the two CRS ports.

In a sixth aspect, alone or in combination with one or more of the first through fifth aspects, the narrowband cell is not associated with the same PCI as the full-bandwidth cell associated with the CRS transmitted in the one or more CRS resource elements, and process 600 includes receiving an indication of the EPRE differential. In a seventh aspect, alone or in combination with one or more of the first through sixth aspects, the quantity of CRS ports is greater relative to the quantity of NRS ports; two or more CRS ports configured by the BS are virtualized into one or more NRS ports configured by the BS; and determining the NPDSCH EPRE for the OFDM symbol comprises determining the NPDSCH EPRE for the OFDM symbol based at least in part on the two or more CRS ports configured by the BS being virtualized into the one or more NRS ports configured by the BS.

In an eighth aspect, alone or in combination with one or more of the first through seventh aspects, determining the NPDSCH EPRE for the OFDM symbol comprises determining the NPDSCH EPRE for the OFDM symbol based at least in part on a formula, indicated in a table or a specification, for determining a ratio between the NPDSCH EPRE for the OFDM symbol and the NRS EPRE. In a ninth aspect, alone or in combination with one or more of the first through eighth aspects, determining the NPDSCH EPRE for the OFDM symbol comprises identifying the formula in the table or the specification based at least in part on the quantity of CRS ports configured by the BS and the quantity of NRS ports configured by the BS.

In a tenth aspect, alone or in combination with one or more of the first through ninth aspects, determining the NPDSCH EPRE for the OFDM symbol comprises determining the NPDSCH EPRE for the OFDM symbol based at least in part on a formula, indicated in a table or a specification, for determining a ratio between the NPDSCH EPRE for the OFDM symbol and another NPDSCH EPRE for another OFDM symbol that includes only NPDSCH resource elements. In an eleventh aspect, alone or in combination with one or more of the first through tenth aspects, determining the NPDSCH EPRE for the OFDM symbol comprises identifying the formula in the table or the specification based at least in part on the quantity of CRS ports configured by the BS and the quantity of NRS ports configured by the BS.

In a twelfth aspect, alone or in combination with one or more of the first through eleventh aspects, determining the NPDSCH EPRE for the OFDM symbol comprises determining the NPDSCH EPRE for the OFDM symbol based at least in part on the OFDM symbol being modulated using 16QAM or QPSK modulation, and process 600 includes determining a second NPDSCH EPRE for a second OFDM symbol that includes one or more second CRS resource elements and one or more second NPDSCH resource elements to be a same NPDSCH EPRE as a third OFDM symbol that includes one or more third NPDSCH resource elements and one or more NRS resource elements. In a thirteenth aspect, alone or in combination with one or more of the first through twelfth aspects, determining the NPDSCH EPRE for the OFDM symbol comprises determining the NPDSCH EPRE for the OFDM symbol based at least in part on the OFDM symbol being modulated using 16QAM.

In a fourteenth aspect, alone or in combination with one or more of the first through thirteenth aspects, determining the NPDSCH EPRE for the OFDM symbol comprises determining the NPDSCH EPRE for the OFDM symbol based at least in part on receiving an indication of whether to determine the NPDSCH EPRE based at least in part on the EPRE differential or to be a same NPDSCH EPRE as another OFDM symbol that includes one or more other NPDSCH resource elements and one or more NRS resource elements. In a fifteenth aspect, alone or in combination with one or more of the first through fourteenth aspects, determining the NPDSCH EPRE for the OFDM symbol comprises determining the NPDSCH EPRE for the OFDM symbol based at least in part on an indication of the NPDSCH EPRE for the OFDM symbol received from a base station.

In a sixteenth aspect, alone or in combination with one or more of the first through fifteenth aspects, the narrowband cell is not associated with the same PCI as the full-bandwidth cell associated with the CRS transmitted in the one or more CRS resource elements. In a seventeenth aspect, alone or in combination with one or more of the first through sixteenth aspects, the NPDSCH EPRE is different from an NPDSCH EPRE for OFDM symbols that include NPDSCH resource elements and NRS resource elements; the NPDSCH EPRE for OFDM symbols that include NPDSCH resource elements and NRS resource elements is different from an NPDSCH EPRE for OFDM symbols that include only NPDSCH resource elements; and a ratio between the NPDSCH EPRE for OFDM symbols that include NPDSCH resource elements and NRS resource elements and the NPDSCH EPRE for OFDM symbols that include only NPDSCH resource elements is based at least in part on a power boost value applied to the NRS and indicated in a table or a specification.

In an eighteenth aspect, alone or in combination with one or more of the first through seventeenth aspects, the OFDM symbol is modulated using 16QAM. In a nineteenth aspect, alone or in combination with one or more of the first through eighteenth aspects, the OFDM symbol is transmitted in a non-anchor NB-IoT carrier. In a twentieth aspect, alone or in combination with one or more of the first through nineteenth aspects, the base station indicates one or more non-anchor NB-IoT carriers for 16QAM transmission on which the table or the specification may be used.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
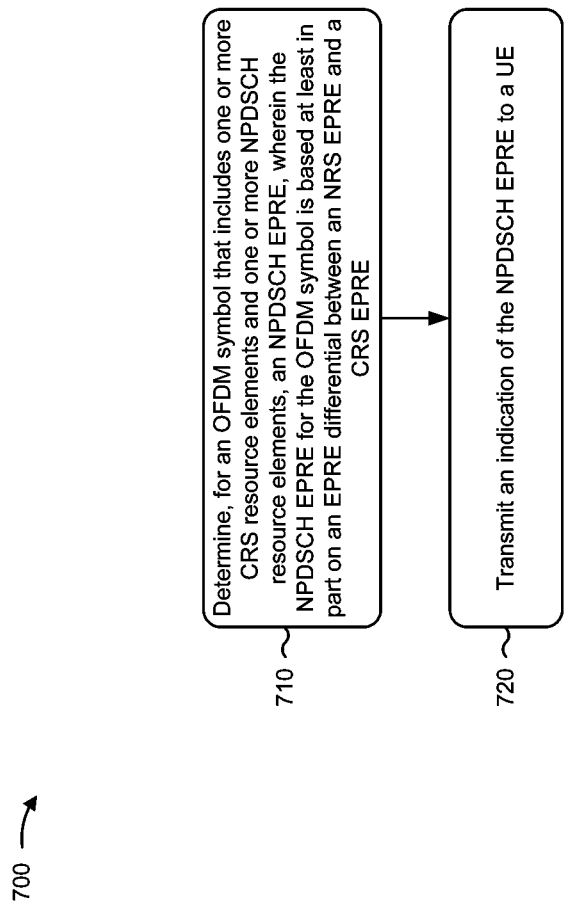
FIG. 7 is a diagram illustrating an example process performed, for example, by a BS, in accordance with various aspects of the present disclosure.

FIG. 7 is a diagram illustrating an example process 700 performed, for example, by a BS, in accordance with various aspects of the present disclosure. Example process 700 is an example where the BS (e.g., the BS 110 illustrated and described in connection with FIGS. 1 and 2, the BS described in connection with FIGS. 3A-3C, the BS illustrated and described in connection with FIGS. 4 and/or 5, and/or the like) performs operations associated with determining an EPRE for a symbol including a CRS.

As shown in FIG. 7, in some aspects, process 700 may include determining, for an OFDM symbol that includes one or more CRS resource elements and one or more NPDSCH resource elements, an NPDSCH EPRE, wherein the NPDSCH EPRE for the OFDM symbol is based at least in part on an EPRE differential between an NRS EPRE and a CRS EPRE (block 710). For example, the BS (e.g., using transmit processor 220, receive processor 238, controller/processor 240, memory 242, and/or the like) may determine, for an OFDM symbol that includes one or more CRS resource elements and one or more NPDSCH resource elements, an NPDSCH EPRE, as described above. In some aspects, the NPDSCH EPRE for the OFDM symbol is based at least in part on an EPRE differential between an NRS EPRE and a CRS EPRE.

As further shown in FIG. 7, in some aspects, process 700 may include transmitting an indication of the NPDSCH EPRE to a UE (block 720). For example, the BS (e.g., using transmit processor 220, receive processor 238, controller/processor 240, memory 242, and/or the like) may transmit an indication of the NPDSCH EPRE to a UE, as described above.

Process 700 may include additional aspects, such as any single aspect or any combination of aspects described below and/or in connection with one or more other processes described elsewhere herein.

In a first aspect, determining the NPDSCH EPRE for the OFDM symbol comprises determining the NPDSCH EPRE for the OFDM symbol based at least in part on at least one of a quantity of CRS ports configured by the BS, a quantity of NRS ports configured by the BS, or whether a narrowband cell is an in-band deployment and is associated with a same PCI as a full-bandwidth cell associated with a CRS transmitted in the one or more CRS resource elements. In a second aspect, alone or in combination with the first aspect, the narrowband cell is associated with the same PCI as the full-bandwidth cell associated with the CRS transmitted in the one or more CRS resource elements.

In a third aspect, alone or in combination with one or more of the first and second aspects, the quantity of CRS ports and the quantity of NRS ports are a same quantity. In a fourth aspect, alone or in combination with one or more of the first through third aspects, the quantity of CRS ports is two CRS ports and the quantity of NRS ports is two NRS ports, and determining the NPDSCH EPRE for the OFDM symbol comprises determining a first NPDSCH EPRE for a first CRS port of the two CRS ports; and determining a second NPDSCH EPRE for a second CRS port of the two CRS ports.

In a fifth aspect, alone or in combination with one or more of the first through fourth aspects, determining the NPDSCH EPRE for the OFDM symbol comprises determining the NPDSCH EPRE for the OFDM symbol based at least in part on a formula, indicated in a table or a specification, for determining a ratio between the NPDSCH EPRE for the OFDM symbol and the NRS EPRE. In a sixth aspect, alone or in combination with one or more of the first through fifth aspects, determining the NPDSCH EPRE for the OFDM symbol comprises identifying the formula in the table or the specification based at least in part on the quantity of CRS ports configured by the BS and the quantity of NRS ports configured by the BS.

In a seventh aspect, alone or in combination with one or more of the first through sixth aspects, determining the NPDSCH EPRE for the OFDM symbol comprises determining the NPDSCH EPRE for the OFDM symbol based at least in part on a formula, indicated in a table or a specification, for determining a ratio between the NPDSCH EPRE for the OFDM symbol and another NPDSCH EPRE for another OFDM symbol that includes only NPDSCH resource elements. In an eighth aspect, alone or in combination with one or more of the first through seventh aspects, determining the NPDSCH EPRE for the OFDM symbol comprises identifying the formula in the table or the specification based at least in part on the quantity of CRS ports configured by the BS and the quantity of NRS ports configured by the BS.

In a ninth aspect, alone or in combination with one or more of the first through eighth aspects, determining the NPDSCH EPRE for the OFDM symbol comprises determining the NPDSCH EPRE for the OFDM symbol based at least in part on the OFDM symbol being modulated using 16QAM or QPSK modulation. In a tenth aspect, alone or in combination with one or more of the first through ninth aspects, determining the NPDSCH EPRE for the OFDM symbol comprises determining the NPDSCH EPRE for the OFDM symbol based at least in part on the OFDM symbol being modulated using 16QAM, and process 700 includes determining a second NPDSCH EPRE for a second OFDM symbol that includes one or more second CRS resource elements and one or more second NPDSCH resource elements to be a same NPDSCH EPRE as a third OFDM symbol that includes one or more third NPDSCH resource elements and one or more NRS resource elements.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
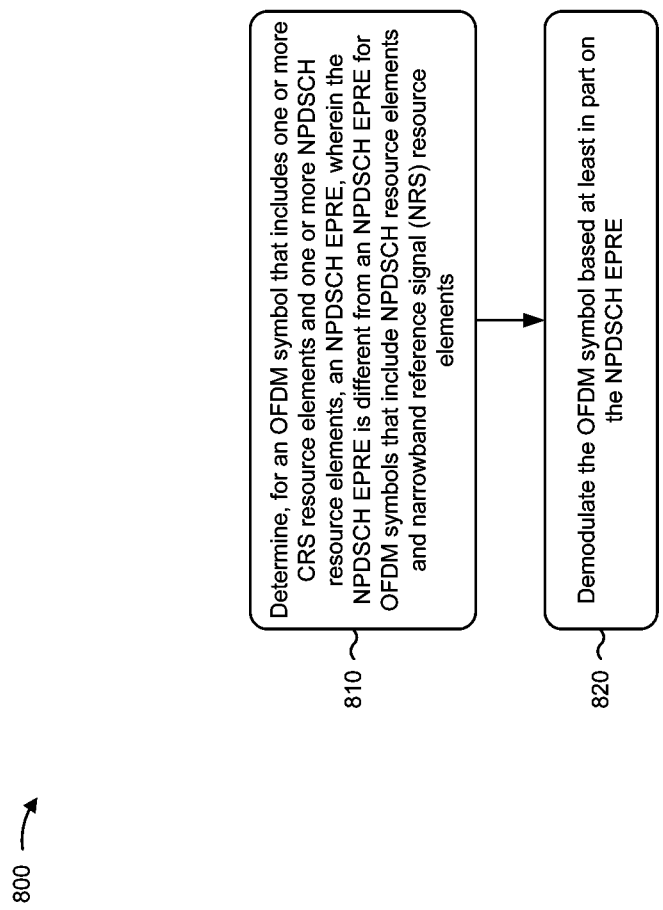
FIG. 8 is a diagram illustrating an example process performed, for example, by a UE, in accordance with various aspects of the present disclosure.

FIG. 8 is a diagram illustrating an example process 800 performed, for example, by a UE, in accordance with various aspects of the present disclosure. Example process 800 is an example where the UE (e.g., the UE 120 illustrated and described in connection with FIGS. 1 and 2, the UE described in connection with FIGS. 3A-3C, the UE illustrated and described in connection with FIGS. 4 and/or 5, and/or the like) performs operations associated with determining an EPRE for a symbol including a CRS.

As shown in FIG. 8, in some aspects, process 800 may include determining, for an OFDM symbol that includes one or more CRS resource elements and one or more NPDSCH resource elements, an NPDSCH EPRE, wherein the NPDSCH EPRE is different from an NPDSCH EPRE for OFDM symbols that include NPDSCH resource elements and NRS resource elements (block 810). For example, the UE (e.g., using receive processor 258, transmit processor 264, controller/processor 280, memory 282, and/or the like) may determine, for an OFDM symbol that includes one or more CRS resource elements and one or more NPDSCH resource elements, an NPDSCH EPRE, as described above. In some aspects, the NPDSCH EPRE is different from an NPDSCH EPRE for OFDM symbols that include NPDSCH resource elements and NRS resource elements.

As further shown in FIG. 8, in some aspects, process 800 may include demodulating the OFDM symbol based at least in part on the NPDSCH EPRE (block 820). For example, the UE (e.g., using receive processor 258, transmit processor 264, controller/processor 280, memory 282, and/or the like) may demodulate the OFDM symbol based at least in part on the NPDSCH EPRE, as described above.

Process 800 may include additional aspects, such as any single aspect or any combination of aspects described below and/or in connection with one or more other processes described elsewhere herein.

In a first aspect, the NPDSCH EPRE for the OFDM symbol is based at least in part on an EPRE differential between an NRS EPRE and a CRS EPRE. In a second aspect, alone or in combination with the first aspect, the NPDSCH EPRE for OFDM symbols that include NPDSCH resource elements and NRS resource elements is different from an NPDSCH EPRE for OFDM symbols that include only NPDSCH resource elements.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, by a BS, in accordance with various aspects of the present disclosure. Example process 900 is an example where the BS (e.g., the BS 110 illustrated and described in connection with FIGS. 1 and 2, the BS described in connection with FIGS. 3A-3C, the BS illustrated and described in connection with FIGS. 4 and/or 5, and/or the like) performs operations associated with determining an EPRE for a symbol including a CRS.

As shown in FIG. 9, in some aspects, process 900 may include determining, for an OFDM symbol that includes one or more CRS resource elements and one or more NPDSCH resource elements, an NPDSCH EPRE, wherein the NPDSCH EPRE is different from an NPDSCH EPRE for OFDM symbols that include NPDSCH resource elements and NRS resource elements (block 910). For example, the BS (e.g., using transmit processor 220, receive processor 238, controller/processor 240, memory 242, and/or the like) may determine, for an OFDM symbol that includes one or more CRS resource elements and one or more NPDSCH resource elements, an NPDSCH EPRE, as described above. In some aspects, the NPDSCH EPRE is different from an NPDSCH EPRE for OFDM symbols that include NPDSCH resource elements and NRS resource elements.

As further shown in FIG. 9, in some aspects, process 900 may include transmitting an indication of the NPDSCH EPRE to a UE (block 920). For example, the BS (e.g., using transmit processor 220, receive processor 238, controller/processor 240, memory 242, and/or the like) may transmit an indication of the NPDSCH EPRE to a UE, as described above.

Process 900 may include additional aspects, such as any single aspect or any combination of aspects described below and/or in connection with one or more other processes described elsewhere herein.

In a first aspect, the NPDSCH EPRE for the OFDM symbol is based at least in part on an EPRE differential between an NRS EPRE and a CRS EPRE. In a second aspect, alone or in combination with the first aspect, the NPDSCH EPRE for OFDM symbols that include NPDSCH resource elements and NRS resource elements is different from an NPDSCH EPRE for OFDM symbols that include only NPDSCH resource elements.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The following provides an overview of aspects of the present disclosure:

Aspect 1: A method of wireless communication performed by a user equipment (UE), comprising: determining, for an orthogonal frequency division (OFDM) symbol that includes one or more cell-specific reference signal (CRS) resource elements and one or more narrowband physical downlink shared channel (NPDSCH) resource elements, an NPDSCH energy per resource element (EPRE), wherein the NPDSCH EPRE for the OFDM symbol is based at least in part on an EPRE differential between a narrowband reference signal (NRS) EPRE and a CRS EPRE; and demodulating the OFDM symbol based at least in part on the NPDSCH EPRE.

Aspect 2: The method of aspect 1, wherein the NPDSCH EPRE for the OFDM symbol is based at least in part on at least one of: a quantity of CRS ports configured by the BS, a quantity of NRS ports configured by the BS, or whether a narrowband cell is an in-band deployment and associated with a same primary cell identifier (PCI) as a full-bandwidth cell associated with a CRS transmitted in the one or more CRS resource elements. Aspect 3: The method of aspect 2, wherein determining the NPDSCH EPRE for the OFDM symbol comprises: determining the NPDSCH EPRE for the OFDM symbol based at least in part on the EPRE differential and at least one of: the quantity of CRS ports configured by the BS, the quantity of NRS ports configured by the BS, or whether the narrowband cell is an in-band deployment and is associated with the same PCI as the full-bandwidth cell associated with the CRS transmitted in the one or more CRS resource elements.

Aspect 4: The method of aspect 3, wherein the narrowband cell is associated with the same PCI as the full-bandwidth cell associated with the CRS transmitted in the one or more CRS resource elements. Aspect 5: The method of aspect 3 or 4, wherein the quantity of CRS ports and the quantity of NRS ports are a same quantity. Aspect 6: The method of aspect 5, wherein the quantity of CRS ports is two CRS ports and the quantity of NRS ports is two NRS ports; and wherein determining the NPDSCH EPRE for the OFDM symbol comprises: determining a first NPDSCH EPRE for a first CRS port of the two CRS ports; and determining a second NPDSCH EPRE for a second CRS port of the two CRS ports.

Aspect 7: The method of aspect 3, wherein the narrowband cell is not associated with the same PCI as the full-bandwidth cell associated with the CRS transmitted in the one or more CRS resource elements; and wherein the method further comprises: receiving an indication of the EPRE differential. Aspect 8: The method of aspect 7, wherein the quantity of CRS ports is greater relative to the quantity of NRS ports; wherein two or more CRS ports configured by the BS are virtualized into one or more NRS ports configured by the BS; and wherein determining the NPDSCH EPRE for the OFDM symbol comprises: determining the NPDSCH EPRE for the OFDM symbol based at least in part on the two or more CRS ports configured by the BS being virtualized into the one or more NRS ports configured by the BS.

Aspect 9: The method of any of aspects 3-8, wherein determining the NPDSCH EPRE for the OFDM symbol comprises: determining the NPDSCH EPRE for the OFDM symbol based at least in part on a formula, indicated in a table or a specification, for determining a ratio between the NPDSCH EPRE for the OFDM symbol and the NRS EPRE. Aspect 10: The method of aspect 9, wherein determining the NPDSCH EPRE for the OFDM symbol comprises: identifying the formula in the table or the specification based at least in part on the quantity of CRS ports configured by the BS and the quantity of NRS ports configured by the BS.

Aspect 11: The method of aspect 3, wherein determining the NPDSCH EPRE for the OFDM symbol comprises: determining the NPDSCH EPRE for the OFDM symbol based at least in part on a formula, indicated in a table or a specification, for determining a ratio between the NPDSCH EPRE for the OFDM symbol and another NPDSCH EPRE for another OFDM symbol that includes only NPDSCH resource elements. Aspect 12: The method of aspect 11, wherein determining the NPDSCH EPRE for the OFDM symbol comprises: identifying the formula in the table or the specification based at least in part on the quantity of CRS ports configured by the BS and the quantity of NRS ports configured by the BS. Aspect 13: The method of any of aspects 3-12, wherein determining the NPDSCH EPRE for the OFDM symbol comprises: determining the NPDSCH EPRE for the OFDM symbol based at least in part on the OFDM symbol being modulated using 16 quadrature amplitude modulation (16QAM) or quadrature phase-shift keying (QPSK) modulation.

Aspect 14: The method any of aspects 3-13, wherein determining the NPDSCH EPRE for the OFDM symbol comprises: determining the NPDSCH EPRE for the OFDM symbol based at least in part on receiving an indication of whether to determine the NPDSCH EPRE based at least in part on the EPRE differential or to be a same NPDSCH EPRE as another OFDM symbol that includes one or more other NPDSCH resource elements and one or more NRS resource elements. Aspect 15: The method of any of aspects 2-14, wherein determining the NPDSCH EPRE for the OFDM symbol comprises: determining the NPDSCH EPRE for the OFDM symbol based at least in part on an indication of the NPDSCH EPRE for the OFDM symbol received from a base station.

Aspect 16: The method of aspect 15, wherein the narrowband cell is not associated with the same PCI as the full-bandwidth cell associated with the CRS transmitted in the one or more CRS resource elements. Aspect 17: The method of any of aspects 1-16, wherein the NPDSCH EPRE is different from an NPDSCH EPRE for OFDM symbols that include NPDSCH resource elements and NRS resource elements; and wherein the NPDSCH EPRE for OFDM symbols that include NPDSCH resource elements and NRS resource elements is different from an NPDSCH EPRE for OFDM symbols that include only NPDSCH resource elements. Aspect 18: The method of any of aspect 17, wherein a ratio between the NPDSCH EPRE for OFDM symbols that include NPDSCH resource elements and NRS resource elements and the NPDSCH EPRE for OFDM symbols that include only NPDSCH resource elements is based at least in part on a power boost value applied to the NRS and indicated in a table or a specification.

Aspect 19: The method of aspect 18, wherein the OFDM symbol is modulated using 16 quadrature amplitude modulation (16QAM). Aspect 20: The method of aspect 19, wherein the OFDM symbol is transmitted in a non-anchor narrowband Internet of things (NB-IoT) carrier. Aspect 21: The method of aspect 18 wherein the base station indicates one or more non-anchor narrowband Internet of things (NB-IoT) carriers for 16 quadrature amplitude modulation (16QAM) transmission on which the table or the specification may be used.

Aspect 22: A method of wireless communication performed by a base station (BS), comprising: determining, for an orthogonal frequency division (OFDM) symbol that includes one or more cell-specific reference signal (CRS) resource elements and one or more narrowband physical uplink shared channel (NPDSCH) resource elements, an NPDSCH energy per resource element (EPRE), wherein the NPDSCH EPRE for the OFDM symbol is based at least in part on an EPRE differential between a narrowband reference signal (NRS) EPRE and a CRS EPRE; and transmitting an indication of the NPDSCH EPRE to a user equipment (UE).

Aspect 23: The method of aspect 22, wherein determining the NPDSCH EPRE for the OFDM symbol comprises: determining the NPDSCH EPRE for the OFDM symbol based at least in part on at least one of: a quantity of CRS ports configured by the BS, a quantity of NRS ports configured by the BS, or whether a narrowband cell is an in-band deployment and is associated with a same primary cell identifier (PCI) as a full-bandwidth cell associated with a CRS transmitted in the one or more CRS resource elements. Aspect 24: The method of aspect 23, wherein the narrowband cell is associated with the same PCI as the full-bandwidth cell associated with the CRS transmitted in the one or more CRS resource elements.

Aspect 25: The method of aspect 24, wherein the quantity of CRS ports and the quantity of NRS ports are a same quantity. Aspect 26: The method of aspect 25, wherein the quantity of CRS ports is two CRS ports and the quantity of NRS ports is two NRS ports; and wherein determining the NPDSCH EPRE for the OFDM symbol comprises: determining a first NPDSCH EPRE for a first CRS port of the two CRS ports; and determining a second NPDSCH EPRE for a second CRS port of the two CRS ports.

Aspect 27: The method of any of aspects 23-26, wherein determining the NPDSCH EPRE for the OFDM symbol comprises: determining the NPDSCH EPRE for the OFDM symbol based at least in part on a formula, indicated in a table or a specification, for determining a ratio between the NPDSCH EPRE for the OFDM symbol and the NRS EPRE. Aspect 28: The method of aspect 27, wherein determining the NPDSCH EPRE for the OFDM symbol comprises: identifying the formula in the table or the specification based at least in part on the quantity of CRS ports configured by the BS and the quantity of NRS ports configured by the BS.

Aspect 29: The method of any of aspects 23-28, wherein determining the NPDSCH EPRE for the OFDM symbol comprises: determining the NPDSCH EPRE for the OFDM symbol based at least in part on a formula, indicated in a table or a specification, for determining a ratio between the NPDSCH EPRE for the OFDM symbol and another NPDSCH EPRE for another OFDM symbol that includes only NPDSCH resource elements. Aspect 30: The method of aspect 29, wherein determining the NPDSCH EPRE for the OFDM symbol comprises: identifying the formula in the table or the specification based at least in part on the quantity of CRS ports configured by the BS and the quantity of NRS ports configured by the BS.

Aspect 31: The method of any of aspects 22-30, wherein determining the NPDSCH EPRE for the OFDM symbol comprises: determining the NPDSCH EPRE for the OFDM symbol based at least in part on the OFDM symbol being modulated using 16 quadrature amplitude modulation (16QAM) or quadrature phase-shift keying (QPSK) modulation.

Aspect 32: The method of any of aspects 22-31, wherein determining the NPDSCH EPRE for the OFDM symbol comprises: determining the NPDSCH EPRE for the OFDM symbol based at least in part on the OFDM symbol being modulated using 16 quadrature amplitude modulation (16QAM); and wherein the method further comprises: determining a second NPDSCH EPRE for a second OFDM symbol that includes one or more second CRS resource elements and one or more second NPDSCH resource elements to be a same NPDSCH EPRE as a third OFDM symbol that includes one or more third NPDSCH resource elements and one or more NRS resource elements.

Aspect 33: A method of wireless communication performed by a user equipment (UE), comprising: determining, for an orthogonal frequency division (OFDM) symbol that includes one or more cell-specific reference signal (CRS) resource elements and one or more narrowband physical downlink shared channel (NPDSCH) resource elements, an NPDSCH energy per resource element (EPRE), wherein the NPDSCH EPRE is different from an NPDSCH EPRE for OFDM symbols that include NPDSCH resource elements and narrowband reference signal (NRS) resource elements; and demodulating the OFDM symbol based at least in part on the NPDSCH EPRE.

Aspect 34: The method of aspect 33, wherein the NPDSCH EPRE for the OFDM symbol is based at least in part on an EPRE differential between a narrowband reference signal (NRS) EPRE and a CRS EPRE. Aspect 35: The method of aspect 33 or 34, wherein the NPDSCH EPRE for OFDM symbols that include NPDSCH resource elements and NRS resource elements is different from an NPDSCH EPRE for OFDM symbols that include only NPDSCH resource elements.

Aspect 36: A method of wireless communication performed by a base station (BS), comprising: determining, for an orthogonal frequency division (OFDM) symbol that includes one or more cell-specific reference signal (CRS) resource elements and one or more narrowband physical uplink shared channel (NPDSCH) resource elements, an NPDSCH energy per resource element (EPRE), wherein the NPDSCH EPRE is different from an NPDSCH EPRE for OFDM symbols that include NPDSCH resource elements and narrowband reference signal (NRS) resource elements; and transmitting an indication of the NPDSCH EPRE to a user equipment (UE).

Aspect 37: The method of aspect 36, wherein the NPDSCH EPRE for the OFDM symbol is based at least in part on an EPRE differential between a narrowband reference signal (NRS) EPRE and a CRS EPRE. Aspect 38: The method of aspect 36 or 37, wherein the NPDSCH EPRE for OFDM symbols that include NPDSCH resource elements and NRS resource elements is different from an NPDSCH EPRE for OFDM symbols that include only NPDSCH resource elements.

Aspect 39: An apparatus for wireless communication at a device, comprising a processor; memory coupled with the processor; and instructions stored in the memory and executable by the processor to cause the apparatus to perform the method of one or more aspects of aspects 1-38. Aspect 40: A device for wireless communication, comprising a memory and one or more processors coupled to the memory, the memory and the one or more processors configured to perform the method of one or more aspects of aspects 1-38.

Aspect 41: An apparatus for wireless communication, comprising at least one means for performing the method of one or more aspects of aspects 1-38. Aspect 42: A non-transitory computer-readable medium storing code for wireless communication, the code comprising instructions executable by a processor to perform the method of one or more aspects of aspects 1-38. Aspect 43: A non-transitory computer-readable medium storing a set of instructions for wireless communication, the set of instructions comprising one or more instructions that, when executed by one or more processors of a device, cause the device to perform the method of one or more aspects of aspects 1-38.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining, for an orthogonal frequency division (OFDM) symbol that includes one or more cell-specific reference signal (CRS) resource elements and one or more narrowband physical downlink shared channel (NPDSCH) resource elements, an NPDSCH energy per resource element (EPRE),
        wherein the NPDSCH EPRE for the OFDM symbol is based at least in part on an EPRE differential between a narrowband reference signal (NRS) EPRE and a CRS EPRE, and
        wherein the EPRE differential between the NRS EPRE and the CRS EPRE is based at least in part on a ratio of a quantity of configured CRS ports and a quantity of configured NRS ports; and
    demodulating the OFDM symbol based at least in part on the NPDSCH EPRE.

2. The method of claim 1, wherein the NPDSCH EPRE for the OFDM symbol is based at least in part on:
    whether a narrowband cell is an in-band deployment and associated with a same primary cell identifier (PCI) as a full-bandwidth cell associated with a CRS transmitted in the one or more CRS resource elements.

3. The method of claim 2, wherein determining the NPDSCH EPRE for the OFDM symbol comprises:
    determining the NPDSCH EPRE for the OFDM symbol based at least in part on the EPRE differential and at least one of:
        the quantity of CRS ports configured by a base station (BS),
        the quantity of NRS ports configured by the BS, or
        whether the narrowband cell is an in-band deployment and is associated with a same PCI as the full-bandwidth cell associated with the CRS transmitted in the one or more CRS resource elements.

4. The method of claim 3, wherein the narrowband cell is associated with the same PCI as the full-bandwidth cell associated with the CRS transmitted in the one or more CRS resource elements.

5. The method of claim 3, wherein the quantity of CRS ports and the quantity of NRS ports are a same quantity.

6. The method of claim 5, wherein the quantity of CRS ports is two CRS ports and the quantity of NRS ports is two NRS ports; and
    wherein determining the NPDSCH EPRE for the OFDM symbol comprises:
        determining a first NPDSCH EPRE for a first CRS port of the two CRS ports; and
        determining a second NPDSCH EPRE for a second CRS port of the two CRS ports.

7. The method of claim 3, wherein the narrowband cell is not associated with the same PCI as the full-bandwidth cell associated with the CRS transmitted in the one or more CRS resource elements; and
    wherein the method further comprises:
        receiving an indication of the EPRE differential.

8. The method of claim 7, wherein the quantity of CRS ports is greater relative to the quantity of NRS ports;
    wherein two or more CRS ports configured by a base station (BS) are virtualized into one or more NRS ports configured by the BS; and
    wherein determining the NPDSCH EPRE for the OFDM symbol comprises:
        determining the NPDSCH EPRE for the OFDM symbol based at least in part on the two or more CRS ports configured by the BS being virtualized into the one or more NRS ports configured by the BS.

9. The method of claim 3, wherein determining the NPDSCH EPRE for the OFDM symbol comprises:
    determining the NPDSCH EPRE for the OFDM symbol based at least in part on a formula, indicated in a table or a specification, for determining a ratio between the NPDSCH EPRE for the OFDM symbol and the NRS EPRE.

10. The method of claim 9, wherein determining the NPDSCH EPRE for the OFDM symbol comprises:
    identifying the formula in the table or the specification based at least in part on the quantity of CRS ports configured by the BS and the quantity of NRS ports configured by the BS.

11. The method of claim 3, wherein determining the NPDSCH EPRE for the OFDM symbol comprises:
    determining the NPDSCH EPRE for the OFDM symbol based at least in part on a formula, indicated in a table or a specification, for determining a ratio between the NPDSCH EPRE for the OFDM symbol and another NPDSCH EPRE for another OFDM symbol that includes only NPDSCH resource elements.

12. The method of claim 11, wherein determining the NPDSCH EPRE for the OFDM symbol comprises:
    identifying the formula in the table or the specification based at least in part on the quantity of CRS ports configured by the BS and the quantity of NRS ports configured by the BS.

13. The method of claim 3, wherein determining the NPDSCH EPRE for the OFDM symbol comprises:
    determining the NPDSCH EPRE for the OFDM symbol based at least in part on the OFDM symbol being modulated using 16 quadrature amplitude modulation (16QAM) or quadrature phase-shift keying (QPSK) modulation.

14. The method of claim 3, wherein determining the NPDSCH EPRE for the OFDM symbol comprises:
   determining the NPDSCH EPRE for the OFDM symbol based at least in part on receiving an indication of whether to determine the NPDSCH EPRE based at least in part on the EPRE differential or to be a same NPDSCH EPRE as another OFDM symbol that includes one or more other NPDSCH resource elements and one or more NRS resource elements.

15. The method of claim 2, wherein determining the NPDSCH EPRE for the OFDM symbol comprises:
   determining the NPDSCH EPRE for the OFDM symbol based at least in part on an indication of the NPDSCH EPRE for the OFDM symbol received from a base station.

16. The method of claim 15, wherein the narrowband cell is not associated with a same PCI as the full-bandwidth cell associated with the CRS transmitted in the one or more CRS resource elements.

17. The method of claim 1, wherein the NPDSCH EPRE is different from an NPDSCH EPRE for OFDM symbols that include NPDSCH resource elements and NRS resource elements; and
   wherein the NPDSCH EPRE for OFDM symbols that include NPDSCH resource elements and NRS resource elements is different from an NPDSCH EPRE for OFDM symbols that include only NPDSCH resource elements.

18. The method of claim 17, wherein a ratio between the NPDSCH EPRE for OFDM symbols that include NPDSCH resource elements and NRS resource elements and the NPDSCH EPRE for OFDM symbols that include only NPDSCH resource elements is based at least in part on a power boost value applied to the NRS and indicated in a table or a specification.

19. The method of claim 18, wherein the OFDM symbol is modulated using 16 quadrature amplitude modulation (16QAM).

20. The method of claim 19, wherein the OFDM symbol is transmitted in a non-anchor narrowband Internet of things (NB-IoT) carrier.

21. The method of claim 18, wherein a base station indicates one or more non-anchor narrowband Internet of things (NB-IoT) carriers for 16 quadrature amplitude modulation (16QAM) transmission on which the table or the specification is used.

22. A method of wireless communication performed by a base station (BS), comprising:
   determining, for an orthogonal frequency division (OFDM) symbol that includes one or more cell-specific reference signal (CRS) resource elements and one or more narrowband physical uplink shared channel (NPDSCH) resource elements, an NPDSCH energy per resource element (EPRE),
      wherein the NPDSCH EPRE for the OFDM symbol is based at least in part on an EPRE differential between a narrowband reference signal (NRS) EPRE and a CRS EPRE, and
      wherein the EPRE differential between the NRS EPRE and the CRS EPRE is based at least in part on a ratio of a quantity of configured CRS ports and a quantity of configured NRS ports; and
   transmitting an indication of the NPDSCH EPRE to a user equipment (UE).

23. The method of claim 22, wherein determining the NPDSCH EPRE for the OFDM symbol comprises:
   determining the NPDSCH EPRE for the OFDM symbol based at least in part on:
      whether a narrowband cell is an in-band deployment and is associated with a same primary cell identifier (PCI) as a full-bandwidth cell associated with a CRS transmitted in the one or more CRS resource elements.

24. The method of claim 23, wherein the narrowband cell is associated with a same PCI as the full-bandwidth cell associated with the CRS transmitted in the one or more CRS resource elements.

25. The method of claim 24, wherein the quantity of CRS ports and the quantity of NRS ports are a same quantity.

26. The method of claim 25, wherein the quantity of CRS ports is two CRS ports and the quantity of NRS ports is two NRS ports; and
   wherein determining the NPDSCH EPRE for the OFDM symbol comprises:
      determining a first NPDSCH EPRE for a first CRS port of the two CRS ports; and
      determining a second NPDSCH EPRE for a second CRS port of the two CRS ports.

27. The method of claim 23, wherein determining the NPDSCH EPRE for the OFDM symbol comprises:
   determining the NPDSCH EPRE for the OFDM symbol based at least in part on a formula, indicated in a table or a specification, for determining a ratio between the NPDSCH EPRE for the OFDM symbol and the NRS EPRE.

28. The method of claim 27, wherein determining the NPDSCH EPRE for the OFDM symbol comprises:
   identifying the formula in the table or the specification based at least in part on the quantity of CRS ports configured by the BS and the quantity of NRS ports configured by the BS.

29. The method of claim 23, wherein determining the NPDSCH EPRE for the OFDM symbol comprises:
   determining the NPDSCH EPRE for the OFDM symbol based at least in part on a formula, indicated in a table or a specification, for determining a ratio between the NPDSCH EPRE for the OFDM symbol and another NPDSCH EPRE for another OFDM symbol that includes only NPDSCH resource elements.

30. The method of claim 29, wherein determining the NPDSCH EPRE for the OFDM symbol comprises:
   identifying the formula in the table or the specification based at least in part on the quantity of CRS ports configured by the BS and the quantity of NRS ports configured by the BS.

31. The method of claim 22, wherein determining the NPDSCH EPRE for the OFDM symbol comprises:
   determining the NPDSCH EPRE for the OFDM symbol based at least in part on the OFDM symbol being modulated using 16 quadrature amplitude modulation (16QAM) or quadrature phase-shift keying (QPSK) modulation.

32. The method of claim 22, wherein determining the NPDSCH EPRE for the OFDM symbol comprises:
   determining the NPDSCH EPRE for the OFDM symbol based at least in part on the OFDM symbol being modulated using 16 quadrature amplitude modulation (16QAM); and
   wherein the method further comprises:
      determining a second NPDSCH EPRE for a second OFDM symbol that includes one or more second CRS resource elements and one or more second NPDSCH resource elements to be a same NPDSCH EPRE as a third OFDM symbol that includes one or more third NPDSCH resource elements and one or more NRS resource elements.

33. A user equipment (UE) for wireless communication, comprising:
a memory; and
one or more processors coupled to the memory, the one or more processors configured to:
determine, for an orthogonal frequency division (OFDM) symbol that includes one or more cell-specific reference signal (CRS) resource elements and one or more narrowband physical downlink shared channel (NPDSCH) resource elements, an NPDSCH energy per resource element (EPRE),
wherein the NPDSCH EPRE for the OFDM symbol is based at least in part on an EPRE differential between a narrowband reference signal (NRS) EPRE and a CRS EPRE, and
wherein the EPRE differential between the NRS EPRE and the CRS EPRE is based at least in part on a ratio of a quantity of configured CRS ports and a quantity of configured NRS ports; and
demodulate the OFDM symbol based at least in part on the NPDSCH EPRE.

34. The UE of claim 33, wherein the NPDSCH EPRE is different from an NPDSCH EPRE for OFDM symbols that include NPDSCH resource elements and NRS resource elements, and
wherein the NPDSCH EPRE for OFDM symbols that include NPDSCH resource elements and NRS resource elements is different from an NPDSCH EPRE for OFDM symbols that include only NPDSCH resource elements.

35. A base station (BS) for wireless communication, comprising:
a memory; and
one or more processors coupled to the memory, the one or more processors configured to:
determine, for an orthogonal frequency division (OFDM) symbol that includes one or more cell-specific reference signal (CRS) resource elements and one or more narrowband physical uplink shared channel (NPDSCH) resource elements, an NPDSCH energy per resource element (EPRE),
wherein the NPDSCH EPRE for the OFDM symbol is based at least in part on an EPRE differential between a narrowband reference signal (NRS) EPRE and a CRS EPRE, and
wherein the EPRE differential between the NRS EPRE and the CRS EPRE is based at least in part on a ratio of a quantity of configured CRS ports and a quantity of configured NRS ports; and
transmit an indication of the NPDSCH EPRE to a user equipment (UE).

36. The BS of claim 35, wherein the NPDSCH EPRE is different from an NPDSCH EPRE for OFDM symbols that include NPDSCH resource elements and NRS resource elements, and
wherein the NPDSCH EPRE for OFDM symbols that include NPDSCH resource elements and NRS resource elements is different from an NPDSCH EPRE for OFDM symbols that include only NPDSCH resource elements.

37. A method of wireless communication performed by a user equipment (UE), comprising:
determining, for an orthogonal frequency division (OFDM) symbol that includes one or more cell-specific reference signal (CRS) resource elements and one or more narrowband physical downlink shared channel (NPDSCH) resource elements, an NPDSCH energy per resource element (EPRE),
wherein the NPDSCH EPRE is different from an NPDSCH EPRE for OFDM symbols that include NPDSCH resource elements and narrowband reference signal (NRS) resource elements, and
wherein the EPRE differential between the NRS EPRE and the CRS EPRE is based at least in part on a ratio of a quantity of configured CRS ports and a quantity of configured NRS ports; and
demodulating the OFDM symbol based at least in part on the NPDSCH EPRE.

38. The method of claim 37, wherein the NPDSCH EPRE for OFDM symbols that include NPDSCH resource elements and NRS resource elements is different from an NPDSCH EPRE for OFDM symbols that include only NPDSCH resource elements.

39. The method of claim 37, wherein the NPDSCH EPRE for the OFDM symbol is based at least in part on an EPRE differential between an NRS EPRE and a CRS EPRE.

40. A method of wireless communication performed by a base station (BS), comprising:
determining, for an orthogonal frequency division (OFDM) symbol that includes one or more cell-specific reference signal (CRS) resource elements and one or more narrowband physical uplink shared channel (NPDSCH) resource elements, an NPDSCH energy per resource element (EPRE),
wherein the NPDSCH EPRE is different from an NPDSCH EPRE for OFDM symbols that include NPDSCH resource elements and narrowband reference signal (NRS) resource elements, and
wherein the EPRE differential between the NRS EPRE and the CRS EPRE is based at least in part on a ratio of a quantity of configured CRS ports and a quantity of configured NRS ports; and
transmitting an indication of the NPDSCH EPRE to a user equipment (UE).

41. The method of claim 40, wherein the NPDSCH EPRE for OFDM symbols that include NPDSCH resource elements and NRS resource elements is different from an NPDSCH EPRE for OFDM symbols that include only NPDSCH resource elements.

42. The method of claim 40, wherein the NPDSCH EPRE for the OFDM symbol is based at least in part on an EPRE differential between an NRS EPRE and a CRS EPRE.

43. A user equipment (UE) for wireless communication, comprising:
a memory; and
one or more processors coupled to the memory, the one or more processors configured to:
determine, for an orthogonal frequency division (OFDM) symbol that includes one or more cell-specific reference signal (CRS) resource elements and one or more narrowband physical downlink shared channel (NPDSCH) resource elements, an NPDSCH energy per resource element (EPRE),
wherein the NPDSCH EPRE is different from an NPDSCH EPRE for OFDM symbols that include NPDSCH resource elements and narrowband reference signal (NRS) resource elements,
wherein the EPRE differential between the NRS EPRE and the CRS EPRE is based at least in part on a ratio of a quantity of configured CRS ports and a quantity of configured NRS ports; and demodulate the OFDM symbol based at least in part on the NPDSCH EPRE.

44. The UE of 43, wherein the NPDSCH EPRE for OFDM symbols that include NPDSCH resource elements and NRS resource elements is different from an NPDSCH EPRE for OFDM symbols that include only NPDSCH resource elements.

45. The UE of claim 43, wherein the NPDSCH EPRE for the OFDM symbol is based at least in part on an EPRE differential between an NRS EPRE and a CRS EPRE.

46. A base station (BS) for wireless communication, comprising:
- a memory; and
- one or more processors coupled to the memory, the one or more processors configured to:
  - determine, for an orthogonal frequency division (OFDM) symbol that includes one or more cell-specific reference signal (CRS) resource elements and one or more narrowband physical uplink shared channel (NPDSCH) resource elements, an NPDSCH energy per resource element (EPRE),
  - wherein the NPDSCH EPRE is different from an NPDSCH EPRE for OFDM symbols that include NPDSCH resource elements and narrowband reference signal (NRS) resource elements, and
  - wherein the EPRE differential between the NRS EPRE and the CRS EPRE is based at least in part on a ratio of a quantity of configured CRS ports and a quantity of configured NRS ports; and
  - transmit an indication of the NPDSCH EPRE to a user equipment (UE).

47. The BS of claim 46, wherein the NPDSCH EPRE for OFDM symbols that include NPDSCH resource elements and NRS resource elements is different from an NPDSCH EPRE for OFDM symbols that include only NPDSCH resource elements.

48. The BS of claim 46, wherein the NPDSCH EPRE for the OFDM symbol is based at least in part on an EPRE differential between an NRS EPRE and a CRS EPRE.

* * * * *